US011992849B2

(12) United States Patent
Conrad

(10) Patent No.: US 11,992,849 B2
(45) **Date of Patent: *May 28, 2024**

(54) AIR TREATMENT APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,029

(22) Filed: Jul. 25, 2023

(65) Prior Publication Data

US 2023/0364623 A1 Nov. 16, 2023

Related U.S. Application Data

(63) Continuation of application No. 17/719,265, filed on Apr. 12, 2022, now Pat. No. 11,759,796, which is a (Continued)

(51) Int. Cl.

*A47L 9/16* (2006.01)
*A47L 9/28* (2006.01)

(Continued)

(52) U.S. Cl.

CPC .............. *B04C 5/28* (2013.01); *A47L 9/1641* (2013.01); *A47L 9/1683* (2013.01);

(Continued)

(58) Field of Classification Search

CPC .. B04C 5/28; B04C 5/185; B04C 5/26; A47L 9/1641; A47L 9/1683; A47L 9/2873;

(Continued)

(56) References Cited

U.S. PATENT DOCUMENTS 2,213,233 A 9/1940 Tigner
2,662,610 A 12/1953 Heinrich (Continued)

FOREIGN PATENT DOCUMENTS

CA 2492737 A1 11/2005
CN 107233049 A 10/2017

(Continued)

OTHER PUBLICATIONS

International SPreliminary Report on Patentability, received in connection to International Patent Application No. PCTCA2019/051431, dated May 6, 2021.

(Continued)

*Primary Examiner* — Dung H Bui
(74) *Attorney, Agent, or Firm* — Philip C. Mendes da Costa; BERESKIN & PARR LLP/S.E.N.C.R.L., s.r.l.

(57) ABSTRACT

A vacuum cleaner or a docking station has momentum separator having first and second sidewalls which are porous. A first air flow chamber is located exterior to the momentum separator between a first end wall, which is spaced from and faces the first side screen, and the first side screen. A second air flow chamber is located exterior to the momentum separator between a second end wall, which is spaced from and faces the second side screen, and the second side screen. In operation, air exits the momentum separator through the first and second side screens and travels through the first and second air flow chambers to the air outlet of the first and second air flow chambers.

15 Claims, 27 Drawing Sheets

Related U.S. Application Data continuation of application No. 16/594,396, filed on Oct. 7, 2019, now Pat. No. 11,318,482.

(60) Provisional application No. 62/748,840, filed on Oct. 22, 2018.

(51) Int. Cl.
*B04C 5/185* (2006.01)
*B04C 5/26* (2006.01)
*B04C 5/28* (2006.01)

(52) U.S. Cl.
CPC ............ *A47L 9/2873* (2013.01); *B04C 5/185* (2013.01); *B04C 5/26* (2013.01); *A47L 9/1616* (2013.01); *A47L 2201/024* (2013.01)

(58) Field of Classification Search
CPC ............. A47L 9/1616; A47L 2201/024; A47L 9/2878; A47L 9/106; A47L 9/1608; A47L 9/1666; A47L 9/1691; A47L 9/1658; A47L 9/1625; A47L 9/00; A47L 9/165
See application file for complete search history.

(56) References Cited

U.S. PATENT DOCUMENTS

| | | | |
|---|---|---|---|
| 2,713,920 | A | 7/1955 | Phyl |
| 3,598,731 | A | 8/1971 | Frykhult et al. |
| 4,297,116 | A | 10/1981 | Cusick |
| 4,443,232 | A | 4/1984 | Kaiser |
| 5,080,228 | A | 1/1992 | Maston et al. |
| 5,681,450 | A | 10/1997 | Chitnis et al. |
| 5,746,500 | A | 5/1998 | Chien |
| 5,787,545 | A | 8/1998 | Colens |
| 6,231,649 | B1 | 5/2001 | Dyson et al. |
| 6,389,329 | B1 | 5/2002 | Colens |
| 7,053,578 | B2 | 5/2006 | Diehl et al. |
| 7,223,298 | B2 | 5/2007 | Platt et al. |
| 7,861,366 | B2 | 1/2011 | Hahm et al. |
| 8,572,799 | B2 | 11/2013 | Won et al. |
| 8,984,708 | B2 | 3/2015 | Kuhe et al. |
| 9,039,799 | B2 | 5/2015 | Schook |
| 9,462,920 | B1 | 10/2016 | Morin et al. |
| 9,492,048 | B2 | 11/2016 | Won et al. |
| 9,788,698 | B2 | 10/2017 | Morin et al. |
| 9,888,818 | B2 | 2/2018 | Kuhe et al. |
| 9,931,007 | B2 | 4/2018 | Morin et al. |
| 10,799,887 | B2 | 10/2020 | Hyun et al. |
| 2001/0004879 | A1 | 6/2001 | Umotoy et al. |
| 2008/0201895 | A1 | 8/2008 | Kim et al. |
| 2010/0205915 | A1 | 8/2010 | Oh |
| 2012/0272474 | A1 | 11/2012 | Follows et al. |
| 2012/0284960 | A1 | 11/2012 | Sutton et al. |
| 2012/0311813 | A1 | 12/2012 | Gilbert, Jr. et al. |
| 2013/0152525 | A1 | 6/2013 | Brandner et al. |
| 2014/0033917 | A1 | 2/2014 | Rodgers et al. |
| 2014/0041151 | A1 | 2/2014 | Ford et al. |
| 2014/0090341 | A1 | 4/2014 | Chen |
| 2014/0137364 | A1 | 5/2014 | Stickney et al. |
| 2014/0230179 | A1 | 8/2014 | Matsubara et al. |
| 2014/0373490 | A1 | 12/2014 | Wuebbeling et al. |
| 2015/0216382 | A1 | 8/2015 | Bower et al. |
| 2015/0257618 | A1 | 9/2015 | Bassett et al. |
| 2015/0343366 | A1 | 12/2015 | Wuebbeling et al. |
| 2016/0175749 | A1 | 6/2016 | Suda |
| 2017/0196430 | A1 | 7/2017 | Machida et al. |
| 2017/0273532 | A1 | 9/2017 | Machida et al. |
| 2018/0000302 | A1 | 1/2018 | Hyun et al. |
| 2018/0020894 | A1 | 1/2018 | Sauer et al. |
| 2018/0177367 | A1 | 6/2018 | Amaral et al. |
| 2018/0199776 | A1 | 7/2018 | Sato et al. |
| 2018/0207573 | A1 | 7/2018 | Perl-Olshvang et al. |
| 2018/0368636 | A1 | 12/2018 | Caldwell et al. |
| 2019/0015840 | A1 | 1/2019 | Wulfert et al. |
| 2021/0212538 | A1 | 7/2021 | Lee et al. |

FOREIGN PATENT DOCUMENTS

| | | | |
|---|---|---|---|
| EP | 1243218 | B1 | 5/2010 |
| GB | 1436403 | A | 5/1976 |
| GB | 2467403 | A | 8/2010 |
| JP | 56130129 | A | 10/1981 |
| JP | 2002045313 | A | 2/2002 |
| JP | 2003180587 | A | 7/2003 |
| JP | 2005034213 | A | 2/2005 |
| JP | 2011172748 | A | 9/2011 |
| KR | 1020070012109 | A | 1/2007 |
| KR | 1020160037617 | A | 4/2016 |

OTHER PUBLICATIONS

International Search Report and Written Opinion, received in connection to International Patent Application No. PCTCA2019/051431, dated Jan. 2, 2020.

English machine translation of KR1020160037617A, as published on Apr. 6, 2016.

English machine translation of KR1020070012109A, as published on Jan. 25, 2007.

English machine translation of JP 56130129, published on Oct. 12, 1981.

English machine translation of CN107233049A, as published on Oct. 10, 2017.

English machine translation of EP1243218B1, published on May 19, 2010.

AIR TREATMENT APPARATUS

CROSS REFERENCE TO RELATED APPLICATIONS

This application is a continuation of U.S. patent application Ser. No. 17/719,265, filed on Apr. 12, 2022, which itself is a continuation of U.S. patent application Ser. No. 16/594,396, filed Oct. 7, 2019 and issued as U.S. Pat. No. 11,318,482 on May 3, 2022, which itself claims priority from U.S. Provisional Patent Application No. 62/748,840, filed on Oct. 22, 2018, each of which is herein incorporated by reference in its entirety.

FIELD

The field of disclosure relates generally to surface cleaning apparatus, docking stations to empty a surface cleaning apparatus, such as a robotic surface cleaning apparatus, and also air treatment apparatus for a surface cleaning apparatus.

INTRODUCTION

Various types of robotic surface cleaning apparatus are known. Robotic vacuum cleaner may have a docking station that charges the robotic vacuum cleaner when the robotic vacuum cleaner is connected to the docking station. Also, a docking station may have means to empty a dirt collection chamber of a robotic surface cleaning apparatus.

In addition, surface cleaning apparatus that use a cyclonic cleaning stage that comprises a plurality of cyclones in parallel are known.

SUMMARY

In accordance with a first aspect of this disclosure, a cyclonic array for a surface cleaning apparatus or a docking station for a robotic surface cleaning apparatus comprises a plurality of cyclones is parallel. In accordance with this aspect, the cyclones (which have an axis of rotation that is at an angle to the vertical and, optionally, the axis is oriented generally horizontally) are arranged such that dirt exiting the dirt outlets of the cyclones travels directly to a dirt chamber. Accordingly, the cyclones may be of varying length or the cyclones may be staggered in the direction of the axis of rotation such that an upper cyclone positioned above a lower cyclone has an outlet that is rearward of the rear end of the lower cyclone.

For example, a plurality of cyclones, which are in parallel, may be oriented such that, in operation, some of the cyclones are positioned above other cyclones and the dirt outlets (which may be provided in the sidewall) of the upper cyclones are positioned so as to not overlie the lower cyclones. These cyclones may have the same length but may be staggered so that the dirt outlet end of the upper cyclones is rearward of the dirt outlet end of the lower cyclones. Alternately, or in addition, the lower cyclones may be shorter so that that the dirt outlet end of the upper cyclones is rearward of the dirt outlet end of the lower cyclones.

In accordance with this aspect, there is provided a cyclone array which may be used for a surface cleaning apparatus or a docking station for a robotic surface cleaning apparatus, the cyclone array having a top, a bottom and spaced apart lateral sides, the cyclone array comprising:

(a) a plurality of cyclones arranged in parallel, the plurality of cyclones comprising a first upper cyclone and a first lower cyclone, each cyclone having a cyclone axis of rotation, a front end, an axially spaced apart rear end, an air inlet, an air outlet and a dirt outlet; and, (b) at least one dirt collection chamber in communication with the dirt outlets, wherein, when the cyclone array is oriented with the top above the bottom, the cyclone axes extend at an angle to the vertical and at least a first upper cyclone is positioned above a first lower cyclone and the dirt outlet of the first upper cyclone is spaced axially rearwardly from the rear end of the first lower cyclone.

In any embodiment, a length of the first upper cyclone between the front end and the rear end of the first upper cyclone may be the same as a length of the first lower cyclone between the front end and the rear end of the first lower cyclone.

In any embodiment, a plane that is transverse to the cyclone axis of rotation of the first upper cyclone may be located at the front end of the first upper cyclone and the front end of the first lower cyclone may be located adjacent the plane and a length of the first upper cyclone between the front end and the rear end of the first upper cyclone may be longer than a length of the first lower cyclone between the front end and the rear end of the first lower cyclone.

In any embodiment, the dirt outlet of the first upper cyclone and the dirt outlet of the first lower cyclone may face a floor of a common dirt collection chamber. Optionally, the floor may comprise an openable door.

In any embodiment, the dirt outlet of the first upper cyclone and the dirt outlet of the first lower cyclone may be provided in a sidewall of the cyclones.

In any embodiment, the air inlet and the air outlet may be provided at the front end of the cyclones and the dirt outlet is provided at the rear end of the cyclones.

In any embodiment, when the cyclone array is oriented with the top above the bottom, the cyclone axes may extend generally horizontally.

In any embodiment, the plurality of cyclones may comprise a first plurality of upper cyclones and a second plurality of lower cyclones.

In accordance with another aspect, a docking station of a surface cleaning apparatus, such as a robotic surface cleaning apparatus is provided with a docking port that is removably connectable to the surface cleaning apparatus, an air flow path extending from the docking port to at least one air treatment member. When the surface cleaning apparatus is docked at the docking station, an air stream containing dirt collected in the surface cleaning apparatus is drawn through the docking port into the docking station where the air is treated to remove the collected dirt and a clean air stream is emitted from the docking station. The air stream may be produced by a motor and fan assembly in the surface cleaning apparatus and/or a motor and fan assembly (a suction motor) in the docking station. Accordingly, the docking station may be used to empty the surface cleaning apparatus.

The docking station may use one or more air treatment members. In one embodiment, the docking station uses a first stage momentum separator and a second stage cyclonic unit, which may comprise a plurality of cyclones in parallel. The cyclonic stage may be arranged with the cyclones disposed such that the cyclone axis of rotation is generally horizontal, generally vertical or at angle to the horizontal and/or vertical plane. In other embodiments, the docking station can use a first stage cyclonic unit rather than a first stage momentum separator. Accordingly, in these embodiments, the docking station can comprise two cyclonic stages.

In embodiments wherein the first stage comprises a momentum separator, the momentum separator may have a screen as part or all of an upper wall thereof and/or part or all of a vertical wall. In either case, a facing wall may be provided spaced from and facing the screen. Therefore, a flow channel may be provided between the screen and the facing wall. The facing wall may be spaced from the screen by 2-40, 4-25, 8-15 or 10 $mm/m^3$ per minute of air flow. If the flow channel extends upwardly (e.g., generally vertically) then the flow channel may define a second stage momentum separator.

The screen may have a surface area (flow area) that is 2-100, 10-100, 20-50 or any in between range (e.g., 5-10 or 30) times the cross sectional flow area of the docking port in a direction of flow through the docking port.

In any embodiment, two or more of the cyclonic stage, the momentum separator and the second stage momentum separator may be emptied concurrently (e.g., they may have a common, openable bottom door).

In accordance with this embodiment, there is provided an apparatus including the cyclone array wherein the apparatus has a flow path from an air inlet to an air outlet wherein air travels along an exterior of the cyclones as the air travels from the rear end of the cyclones to the air inlets at the front end of the cyclones.

In accordance with this embodiment, there is also provided a surface cleaning apparatus including the cyclone array. The cyclone array may be a second cyclonic cleaning stage.

In accordance with this embodiment, there is also provided a docking station for a robotic surface cleaning apparatus including the cyclone array.

In accordance with this embodiment, there is also provided an air treatment apparatus, which may be used for a surface cleaning apparatus or a docking station for a robotic surface cleaning apparatus, comprising:

(a) an air flow path extending from an air treatment apparatus air inlet to an air treatment apparatus air outlet; and, (b) a momentum separator positioned in the air flow path, the momentum separator having an upper wall, a lower wall and a sidewall extending between the upper and lower walls, wherein a momentum separator air inlet is provided in an inlet portion of the sidewall, the momentum separator air inlet facing an opposed portion of the sidewall that is opposed to the inlet portion of the sidewall and the inlet portion of the sidewall comprises a side screen.

In any embodiment, air exiting the momentum separator air inlet may be directed generally horizontally towards the opposed portion of the sidewall.

In any embodiment, air exiting the momentum separator air inlet may be directed generally horizontally and downwardly towards the opposed portion of the sidewall.

In any embodiment, air exiting the momentum separator air inlet may be directed generally downwardly.

In any embodiment, the opposed portion of the sidewall may be generally planar.

In any embodiment, the momentum separator air inlet may have an outlet port and the outlet port may extend in a plane that is generally parallel to the opposed portion of the sidewall.

In any embodiment, the inlet portion of the sidewall may extend in a plane that is generally parallel to the opposed portion of the sidewall.

In any embodiment, the lower wall may comprise an openable door.

In any embodiment, the side screen may comprise a majority of the inlet portion of the sidewall.

In any embodiment, the side screen may comprise over 50%, over 60%, over 70%, over 80%, over 90% of the inlet portion of the sidewall.

In any embodiment, the upper wall may also comprise an upper screen. Optionally, the upper screen may comprise a majority of the upper wall. The upper screen may comprise over 50%, over 60%, over 70%, over 80%, over 90% of the upper wall.

In any embodiment, the air treatment apparatus may further comprise an end wall spaced from and facing the side screen wherein an up flow chamber is positioned between the end wall and the side screen.

In any embodiment, the momentum separator may have a bottom openable door.

In any embodiment, the up flow chamber may have a bottom openable up flow chamber door.

In any embodiment, the lower wall may comprise an openable momentum separator door and the momentum separator door and the up flow chamber door are concurrently openable.

In accordance with this embodiment, there is also provided an air treatment apparatus, which may be used for a surface cleaning apparatus or a docking station for a robotic surface cleaning apparatus, comprising:

(a) an air flow path extending from an air treatment apparatus air inlet to an air treatment apparatus air outlet;

(b) a momentum separator positioned in the air flow path, the momentum separator having an upper wall, a lower wall, a sidewall extending between the upper and lower walls and a momentum separator air inlet, the upper wall comprises an upper screen; and, (c) an upper end wall spaced from and facing the upper screen wherein an airflow chamber is positioned between the upper end wall and the upper screen.

In any embodiment, air exiting the momentum separator air inlet may be directed generally horizontally towards the sidewall.

In any embodiment, air exiting the momentum separator air inlet may be directed generally horizontally and downwardly towards the sidewall.

In any embodiment, air exiting the momentum separator air inlet may be directed generally downwardly.

In any embodiment, the air treatment apparatus may further comprise a deflector positioned on the upper wall.

In any embodiment, the lower wall may comprise an openable door.

In any embodiment, the upper screen may comprise a majority of the upper wall. The upper screen may comprise over 50%, over 60%, over 70%, over 80%, over 90% of the upper sidewall.

In any embodiment, the sidewall may also comprise a side screen. The sidewall may comprise first and second opposed sidewalls and the side screen comprises a majority of the first sidewall. The side screen may comprise over 50%, over 60%, over 70%, over 80%, over 90% of the first sidewall. Optionally or in addition, the air treatment apparatus may further comprise an end wall spaced from and facing the side screen wherein an up flow chamber may be positioned between the end wall and the side screen.

In any embodiment, the momentum separator may have a bottom openable door.

In any embodiment, the up flow chamber may have a bottom openable up flow chamber door.

In any embodiment, the lower wall may comprise an openable momentum separator door and the momentum separator door and the up flow chamber door are concurrently openable.

In accordance with this aspect, there is also provided a docking station for a robotic surface cleaning apparatus comprising:

(a) a first stage air treatment chamber;

(b) a second stage cyclone array having a top, a bottom and spaced apart lateral sides, the cyclone array comprising:

(i) a plurality of cyclones arranged in parallel, the plurality of cyclones comprising a first upper cyclone and a first lower cyclone, each cyclone having a cyclone axis of rotation, a front end having an air inlet and an air outlet and an axially spaced apart rear end having a dirt outlet; and, (ii) at least one dirt collection chamber in communication with the dirt outlets, wherein, when the cyclone array is oriented with the top above the bottom, at least a portion of a first upper cyclone is positioned above a first lower cyclone and the dirt outlets are arranged in a staggered configuration whereby dust exiting the dirt outlet of the first upper cyclone is not obstructed by the first lower cyclone.

In any embodiment, at least a portion of the dirt outlet of the first upper cyclone may be spaced rearwardly from the rear end of the first lower cyclone.

In any embodiment, a length of the first upper cyclone between the front end and the rear end of the first upper cyclone may be the same as a length of the first lower cyclone between the front end and the rear end of the first lower cyclone.

In any embodiment, a plane that is transverse to the cyclone axis of rotation of the first upper cyclone may be located at the front end of the first upper cyclone and the front end of the first lower cyclone may be located adjacent the plane and a length of the first upper cyclone between the front end and the rear end of the first upper cyclone may be longer than a length of the first lower cyclone between the front end and the rear end of the first lower cyclone.

In any embodiment, when the cyclone array is oriented with the top above the bottom, the cyclone axes may extend at an angle to the vertical, e.g., at about a 45° to the vertical.

In any embodiment, the plurality of cyclones may comprise a first plurality of upper cyclones and a second plurality of lower cyclones. Optionally, the plurality of cyclones may comprise a first plurality of upper cyclones and a second plurality of lower cyclones.

In any embodiment, the dirt outlet of the first upper cyclone and the dirt outlet of the first lower cyclone may face a floor of a common dirt collection chamber. Optionally, the floor may comprise an openable door.

In any embodiment, the at least one dirt collection chamber may comprise a single common dirt collection chamber and dirt exiting the dirt outlet of the first upper cyclone and dirt exiting the dirt outlet of the first lower cyclone may travel downwardly to a floor of the common dirt collection chamber. Optionally the floor may comprise an openable door.

In any embodiment, dirt exiting the dirt outlet of the first upper cyclone and dirt exiting the dirt outlet of the first lower cyclone may travel downwardly to an openable floor of the at least one dirt collection chamber.

In any embodiment, the dirt outlet of the first upper cyclone and the dirt outlet of the first lower cyclone may be provided in a sidewall of the cyclones.

In any embodiment, when the cyclone array is oriented with the top above the bottom, the cyclone axes may extend generally horizontally.

In any embodiment, air exiting the cyclones may travel downwardly.

In any embodiment, the first stage air treatment chamber may have a dirt collection region with an openable bottom door.

In any embodiment, the first stage air treatment chamber may have a dirt collection region with an openable bottom door.

In any embodiment, the at least one dirt collection chamber may have an openable bottom door and the bottom openable door of the at least one dirt collection chamber may be concurrently openable with the bottom openable door of the first stage air treatment chamber.

In any embodiment, when the cyclone array is oriented with the top above the bottom, the dirt outlet of the first upper cyclone may be positioned above the dirt outlet of the first lower cyclone.

BRIEF DESCRIPTION OF THE DRAWINGS

The drawings included herewith are for illustrating various examples of articles, methods, and apparatuses of the teaching of the present specification and are not intended to limit the scope of what is taught in any way.

In the drawings.

DESCRIPTION OF VARIOUS EMBODIMENTS

Figure 1:
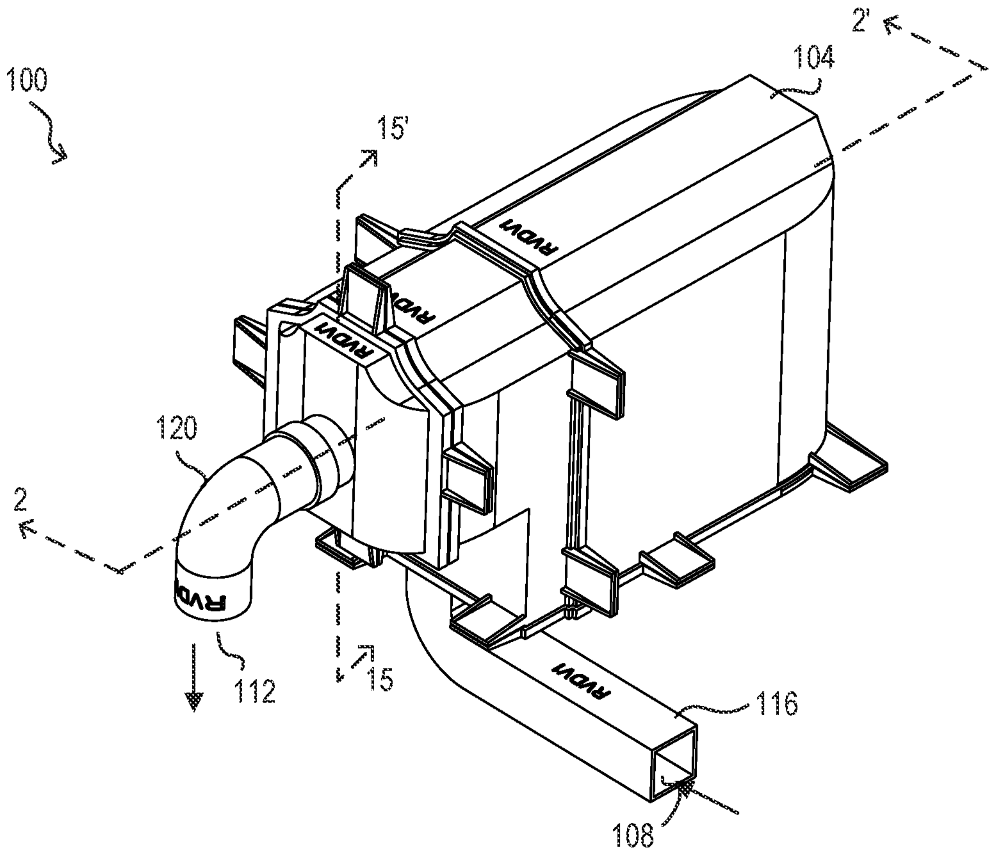
FIG. 1 is a front perspective view of one embodiment of an air treatment apparatus.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Some elements herein may be identified by a part number, which is composed of a base number followed by an alphabetical or subscript-numerical suffix (e.g. 112*a*, or $\mathbf{112}_1$). Multiple elements herein may be identified by part numbers that share a base number in common and that differ by their suffixes (e.g. $\mathbf{112}_1$, $\mathbf{112}_2$, and $\mathbf{112}_3$). All elements with a common base number may be referred to collectively or generically using the base number without a suffix (e.g. 112).

In embodiments described herein, there is provided an air treatment apparatus. The air treatment apparatus may be used in combination with a surface cleaning apparatus, such as a hard floor cleaning apparatus and/or a vacuum cleaner e.g., an upright surface cleaning apparatus, a canister surface cleaning apparatus, a robotic surface cleaning apparatus, a hand vac, a stick vac and/or an extractor). For example, in at least some embodiments, the air treatment apparatus can be used as a "docking station" to facilitate quick emptying of a surface cleaning apparatus from dust or debris that has collected therein during cleaning operation.

In the example applications described herein, the air treatment apparatus may be used as a "docking station" for a robotic surface cleaning device. In particular, an air inlet (docking port) of the air treatment apparatus may be removably coupleable to a port or outlet of the robotic cleaning device. The port or outlet may be, for example, in fluid communication with a dust collecting chamber of the robotic device. A motor and fan assembly drives the flow of air through the air inlet and into the air treatment apparatus. As air is drawn into the air inlet of the air treatment apparatus, debris located inside of the dust collecting chamber is drawn out of the dust collecting chamber and transferred with the air stream into the air treatment apparatus. The air treatment apparatus may accordingly proceed to treat the incoming stream of air to separate dust and debris therefrom. Once some or all of the dust has been transferred out of the robotic device, the air treatment apparatus may be independently cleaned-out. In this manner, the air treatment apparatus facilitates safe and fast emptying of the robotic surface cleaning device without requiring dismantlement (or opening) of the robotic device each time it is desired to empty out dust and debris.

General Description of a Robot Docking Station

Figure 2:
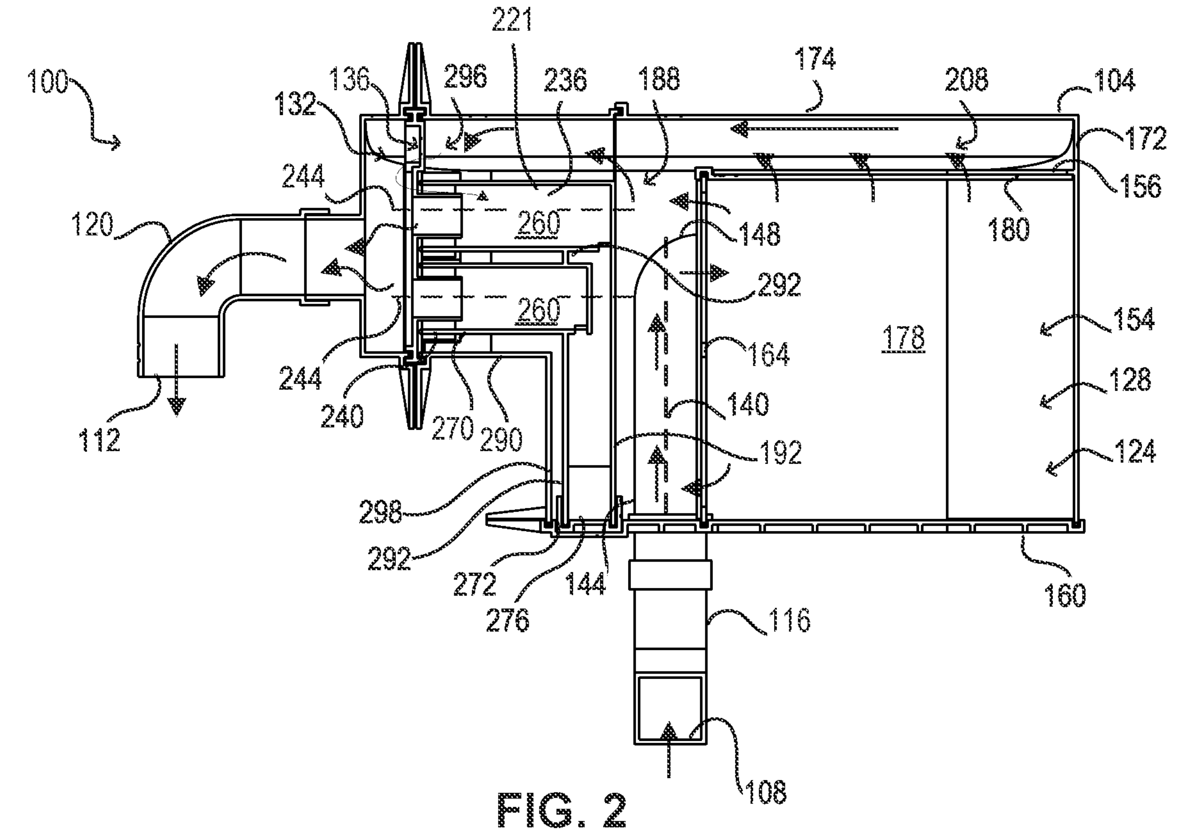
FIG. 2 is a side cross-sectional view along line 2-2' in FIG. 1 of the air treatment apparatus of FIG. 1.
Figure 3:
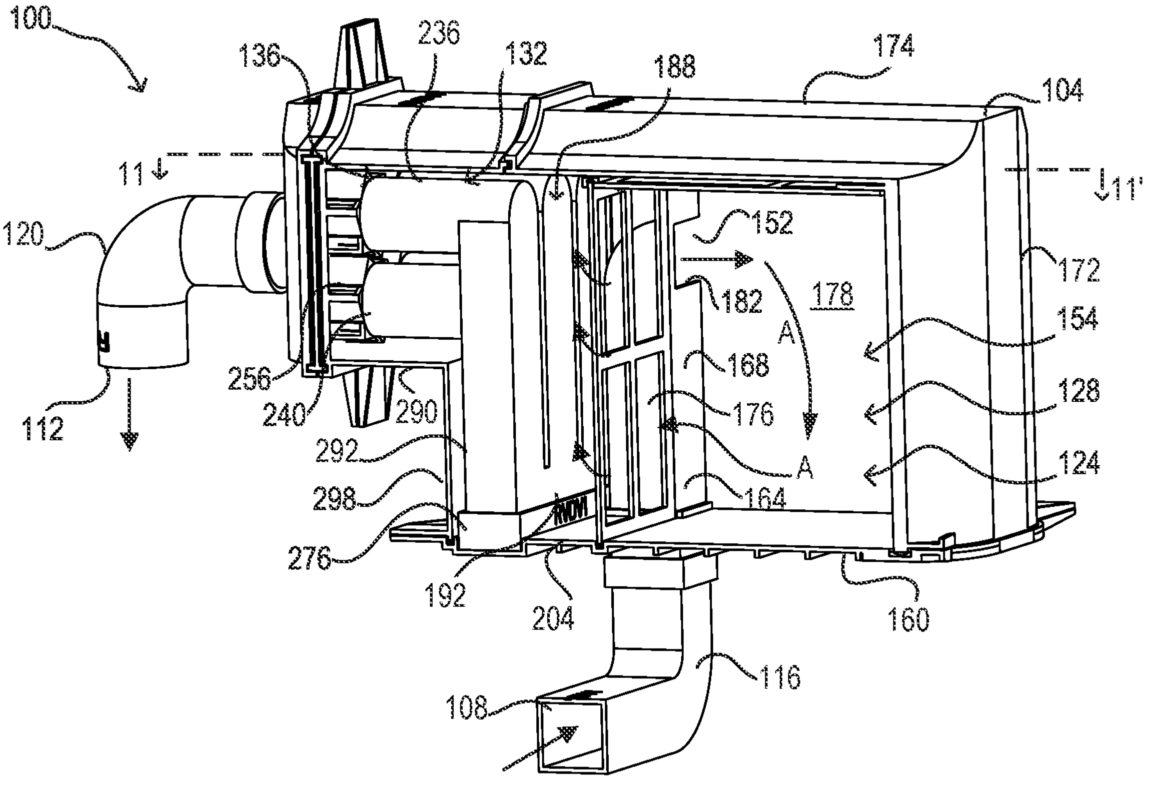
FIG. 3 is a perspective side cross-sectional view along line 2-2' in FIG. 1 of the air treatment apparatus of FIG. 1.

Referring now to FIGS. 1 to 3, a first embodiment of an air treatment apparatus 100 is illustrated. As shown, the air treatment apparatus 100 may include a housing body 104, an air treatment apparatus air inlet 108 (also referred to as a dirty air inlet 108), and an air treatment apparatus air outlet 112 (referred to as a clean air outlet 112). The air treatment apparatus air inlet 108 may be the inlet of a docking station or may be downstream thereof. For example, if the air treatment apparatus 100 is removable from the docking station for emptying, then the air treatment apparatus air inlet 108 may be the inlet of a docking station.

Figure 18:
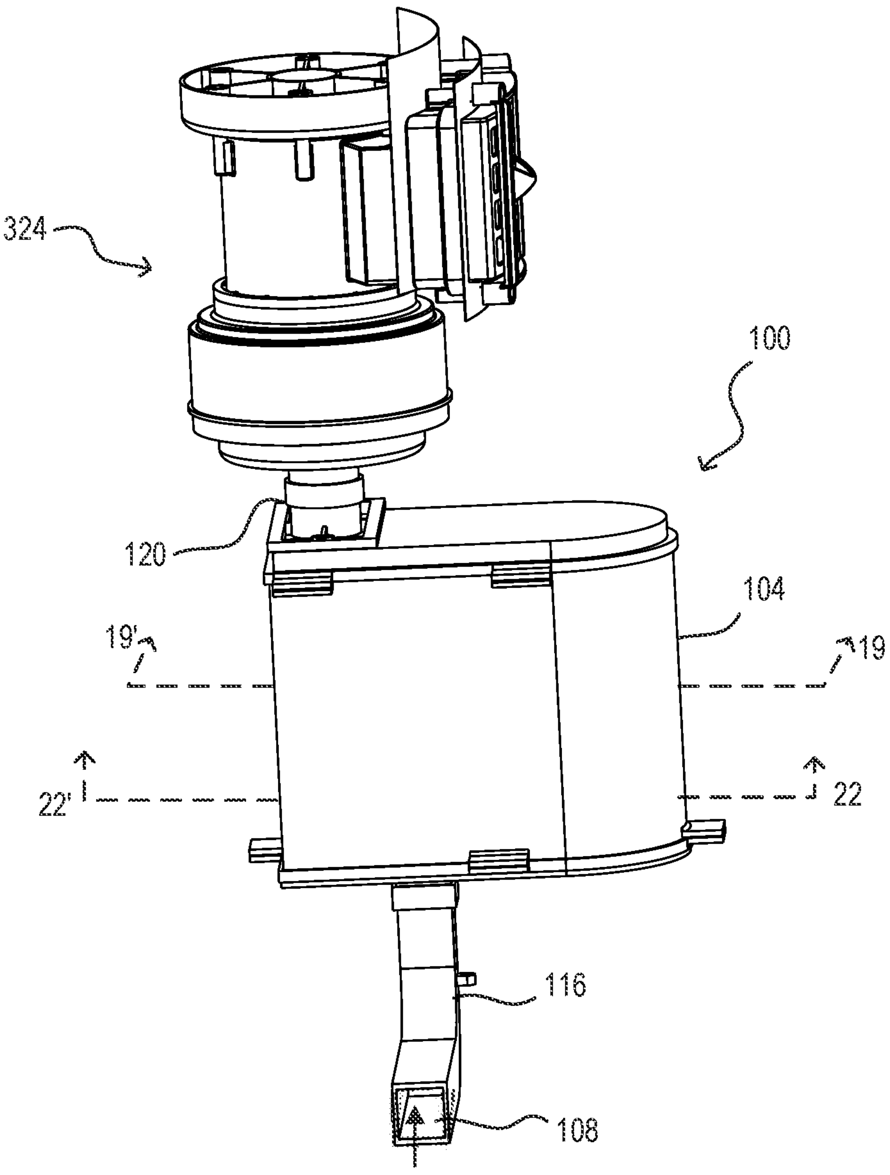
FIG. 18 is a perspective view of another embodiment of the air treatment apparatus.
Figure 19:
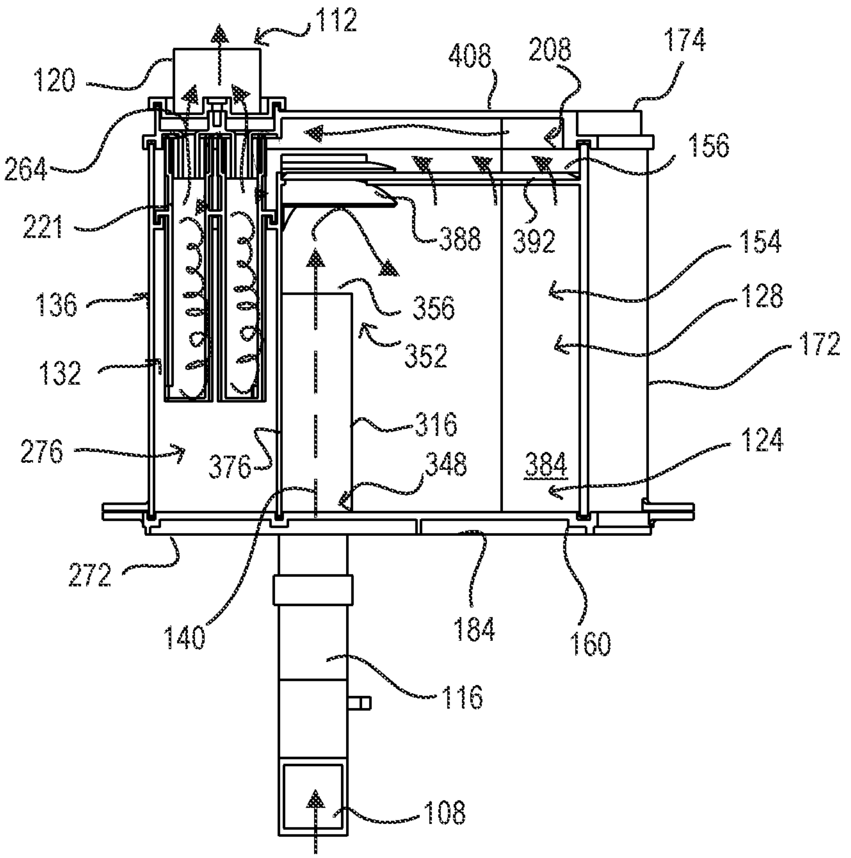
FIG. 19 is a side cross-sectional view along line 19-19' in FIG. 18 of the air treatment apparatus of FIG. 18.
Figure 20:
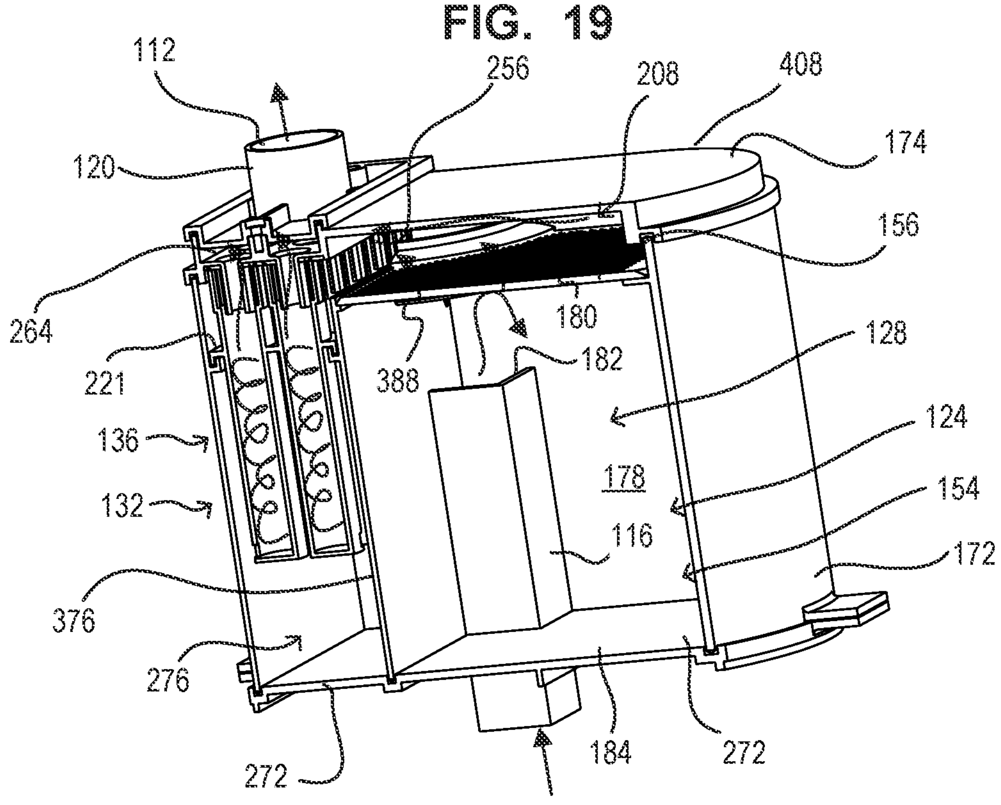
FIG. 20 is a side perspective cross-sectional view along line 19-19' in FIG. 18 of the air treatment apparatus of FIG. 18.
Figure 21:
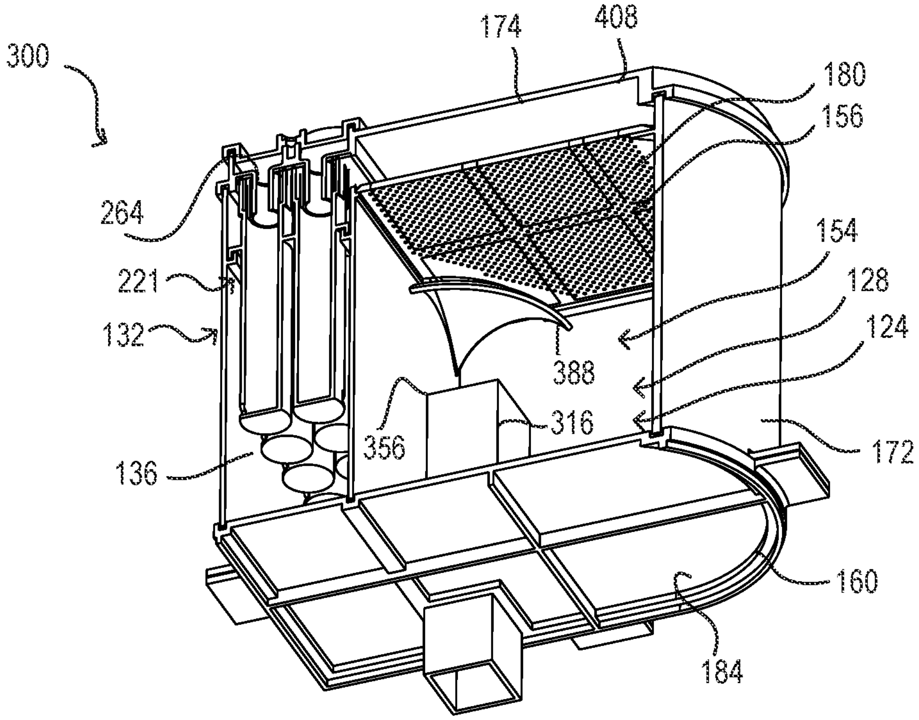
FIG. 21 is another side perspective cross-sectional view along line 19-19' in FIG. 18 of the air treatment apparatus of FIG. 18.
Figure 22:
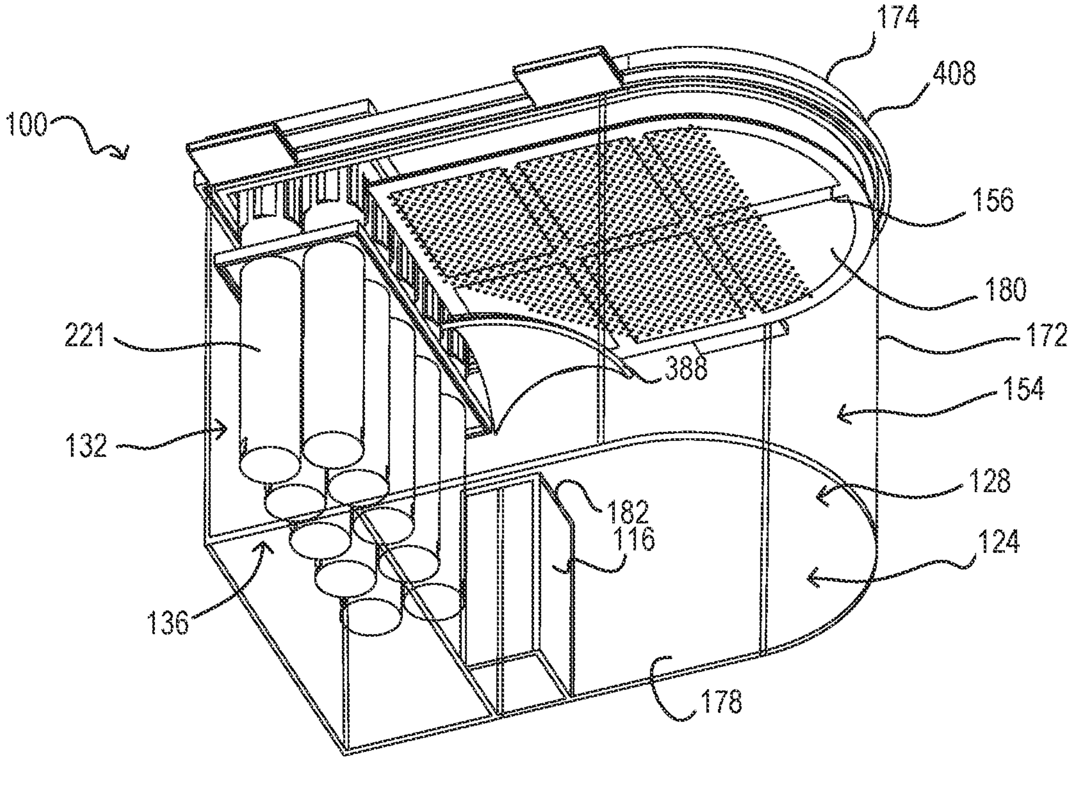
FIG. 22 is a bottom-up perspective cross-sectional view along line 22-22' in FIG. 18 of the air treatment apparatus of FIG. 18.
Figure 23:
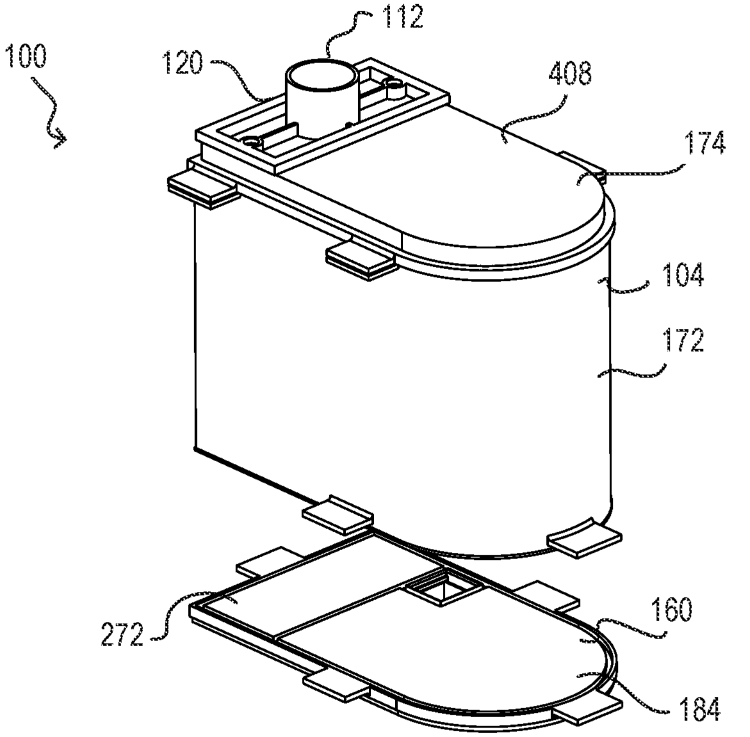
FIG. 23 is a side perspective view of the air treatment apparatus of FIG. 18 with a bottom wall of the air treatment apparatus being removed.
Figure 24:
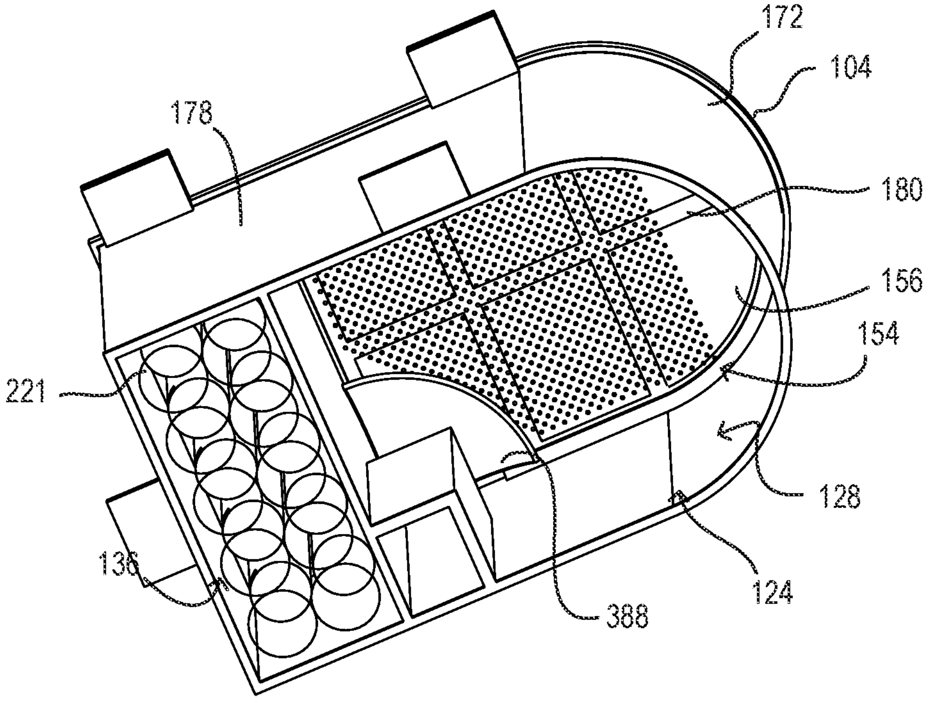
FIG. 24 is bottom-up perspective view of the air treatment apparatus of FIG. 18.

The air treatment apparatus air inlet 108 is configured to accommodate an incoming stream of dirty air that includes, for example, coarse and fine dust, solid debris as well as other air-borne containments. Airflow received by the air inlet 108 travels into the air treatment apparatus 100 and passes through one or more separating stages that are configured to separate the flow of air from the air-borne containments. Relatively cleaner may then exit the air treatment apparatus 100 through the air outlet 112. In at least some embodiments, a suction device (i.e., suction motor) may connect to the air outlet 112 and may generate a suction force to drive the flow of air between the air inlet 108 and the air outlet 112 (e.g., suction motor 324 of FIG. 18).

Referring to FIG. 1, the air inlet 108 may optionally fluidly connect to the air treatment apparatus 100 via an inlet conduit 116. The inlet conduit 116 may extend at a distance from the air treatment housing body 104 to allow a surface cleaning apparatus to "dock" at the air treatment apparatus 100 from a distance. For example, a robotic cleaning device may dock at the air treatment apparatus 100 without necessarily being in abutting engagement with the apparatus 100.

The air treatment apparatus air outlet 112 may also fluidly connect to the air treatment apparatus 100 via an air outlet conduit 120. Alternately, the air outlet conduit 120 may extend from the housing body 104 to allow other devices (i.e., a suction motor) to couple to the air outlet 112 at a spaced distance (e.g., it may be connected to a conduit similar to the conduits used for a built in vacuum system such that the air outlet is exterior to the dwelling). For instance, as exemplified in FIG. 18, the air outlet conduit 120 may extend from the housing body 104 to connect to suction motor 324. Alternately, air treatment apparatus 100 may include a suction motor and the outlet 112 may be a clean air outlet. For example, a suction motor may be included in air treatment apparatus 100 of FIG. 33A.

As exemplified in FIGS. 2 and 3, the inlet conduit 116 may extend into the housing body 104 along an inlet conduit axis 140 between an upstream end 144 and a downstream end 148. The downstream end 148 includes an outlet port 152, which is in fluid communication with a separator which may be a first stage separator 124 with a second stage separator 132 (e.g., one or more cyclones) downstream thereof. Accordingly, the first stage separator 124 is positioned in the flow path to receive dirty air travelling upwardly through the inlet conduit 116 and exiting through the outlet port 152. As exemplified in FIG. 32B, a transverse passage 530 may be positioned below handle 532 and above the first stage separator 124 and the second stage separator 132.

Optional Air Treatment Members for a Docking Station

As exemplified in FIGS. 2 and 3, air treatment apparatus 100 may include a first stage separator 124, and a second stage separator 132 positioned in the airflow path downstream from the first stage separator 132. In the exemplified embodiments of FIGS. 2-28, the first stage separator 124 comprises a momentum separator 128, and the second stage separator 132 comprises a cyclone array 136. The momentum separator 128 and the cyclone array 136 may be both located within the housing body 104 of the air treatment apparatus 100. Alternatively, as exemplified in FIGS. 32A-32D and FIGS. 33A-33B, the air treatment member 100 may include a first stage separator 124 comprising a cyclone 502, and the second stage separator 132 may comprise the cyclone array 136. Accordingly, the first stage separator 124 can comprise a first cyclonic stage, and the second stage separator 132 can comprise a second cyclonic stage.

It will be appreciated that each of the momentum separator and/or cyclone in the first stage separator, and the cyclone array 136 in the second stage separator, as disclosed herein, may be used by itself (e.g., in a surface cleaning apparatus). It will also be appreciated that the momentum separator and/or the cyclone, and the cyclone array may be used in the same surface cleaning apparatus. In some embodiments, the air treatment apparatus can include one or more of the momentum separator, cyclone and cyclone array.

Momentum Separator

The following is a description of momentum separators that may be used in a docking station as exemplified herein (alone or in combination with one or more other air treatment members), or which may be used by themselves or in combination with one or more other air treatment members in a surface cleaning apparatus. The other air treatment member may be a cyclonic array as discussed subsequently.

Referring to FIGS. 2-6, which exemplify an embodiment of a momentum separator 128 which can be used as a first stage separator 124 in the air treatment apparatus 100.

As exemplified, the momentum separator 128 may comprise a momentum separator chamber 154 which is bounded by an upper wall 156 (also referred to as top wall 156), a lower wall 160 (also referred to as a bottom wall 160), a sidewall 164 which extends between the upper wall 156 and the lower wall 160, and an end wall 172 that extends between a top portion 174 (or a top wall 174) of the housing body 104 and the lower wall 160 of the momentum separator 128. The momentum separator chamber 154 is also bounded, on either side, by lateral walls 178 that extend laterally between the sidewall 164 and the end wall 172 of the housing body 104, as well as vertically between the top housing wall 174 and the bottom wall 160 of the momentum separator. In this example, the end wall 172 faces and is distally opposed from the sidewall 164. It will be appreciated that several of the walls may form part of the housing body 104. In this example, lateral walls 178 and end wall 172 form part of housing body 104.

As exemplified, one or more walls of the momentum separator chamber 154 may comprise porous walls, e.g., part or all of one or more of the walls may be partially or fully porous. The porous wall or porous section of a wall is configured to have openings and to be generally air permeable such that air may exit the momentum separator 128 by flowing outwardly through the openings in the porous wall or porous section. The porous wall or porous section may comprise, for example, a screen, a mesh, a net, a shroud, or any other air permeable medium that is configured to pass air flow, while separating (or filtering) the air flow from dust, dirt and other solid debris. The openings in the porous wall may be selected to inhibit dirt of a predetermined size from exiting the momentum separator.

In at least some embodiments, the porous section of a wall may comprise a majority of a wall. For example, the porous portion of a wall may have a surface area that is between 40-100%, 50-100%, 60-100%, 70-100%, 80-1200% or 90-100%, or anywhere in between, of the total surface area of the porous wall.

The surface area of the porous portion(s) that define the air exit of the momentum separator may also be expressed relative to the opening area of a momentum separator air inlet 182. For example, in some cases the one or more porous wall sections may have a surface area (screen area) that is 2-100, 10-100, 20-50 or any in between range (e.g., 5-10 or 30) times the opening area of the momentum separator air inlet 182 (i.e., the cross-section area of the inlet 182 in a direction transverse to the direction of air flow through the inlet 182). An advantage of using a larger porous portion(s) area is that the greater surface area for air to exit the momentum separator 128 produces a reduced flow rate of air through the porous portion(s), thereby reducing the likelihood that dirt may get pushed through the porous portion(s), which would reduce the separation efficiency of the momentum separator. Accordingly, this can facilitate the filtering of dust, dirt and other air-borne containments from the exiting air stream.

Another advantage of using a large air exit is to avoid generating a wind tunnel like effect as air exits the momentum separator 128. In particular, where a large volume of air exits the momentum separator 128 through a small porous portion, the air flow may experience a sudden increase in flow velocity, which results in air-borne containments being less likely to become separated from the exiting stream of air and to therefore clog the openings.

The momentum separator 128 may include any number of porous walls, or walls which include porous sections. For instance, FIGS. 2-6 exemplify an embodiment of the momentum separator 128 in which the sidewall 164 of the momentum separator has a porous section defined by a side screen 176. The side screen 176 provides an outlet for air which enters via outlet port 152 to exit from the momentum separator (see arrow A in FIG. 3). Dust particles, which do not pass through the side screen 176, may collect on the lower wall 160 of the momentum separator 128.

Optionally, in addition or in alternative to the side screen 176, the upper wall 156 of the momentum separator 128 may also comprise a porous wall and may include a top screen 180 which is generally air permeable. Accordingly, air can exit the momentum separator 128 by flowing upwardly and outwardly through the top screen 180.

An advantage of using the combination of a top screen 180 and a side screen 176 is that an even larger surface area is provided for air to exit the momentum separator 128. Accordingly, this generates a further reduction in the velocity of the outgoing air stream, which in turn, facilitates the separation of dust and debris from the stream of air. In at least some embodiments, including both the top screen 180 and the side screen 176 can reduce outgoing airflow velocity by as much as 50% as compared to using only the side screen 176.

FIGS. 19-22 exemplify a further embodiment wherein only the upper wall 156 of the momentum separator 128 include a porous section (e.g., a top screen 180).

Figure 7A:
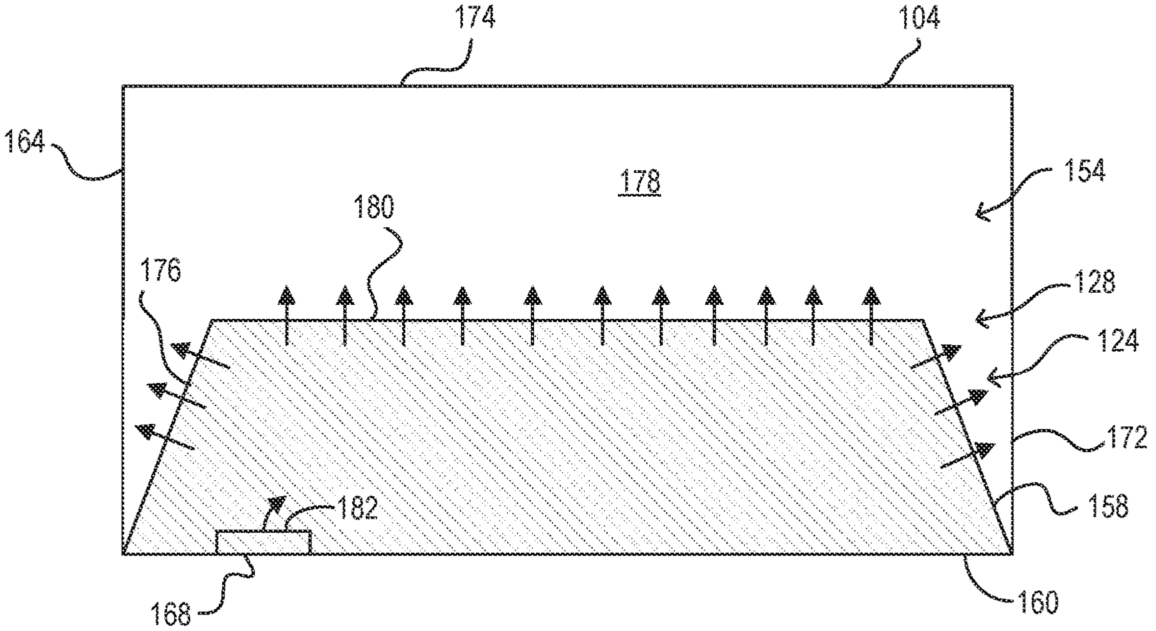
FIG. 7A is a schematic, side cross-sectional view along line 2-2' in FIG. 1 of the momentum separator according to another example embodiment.
Figure 7B:
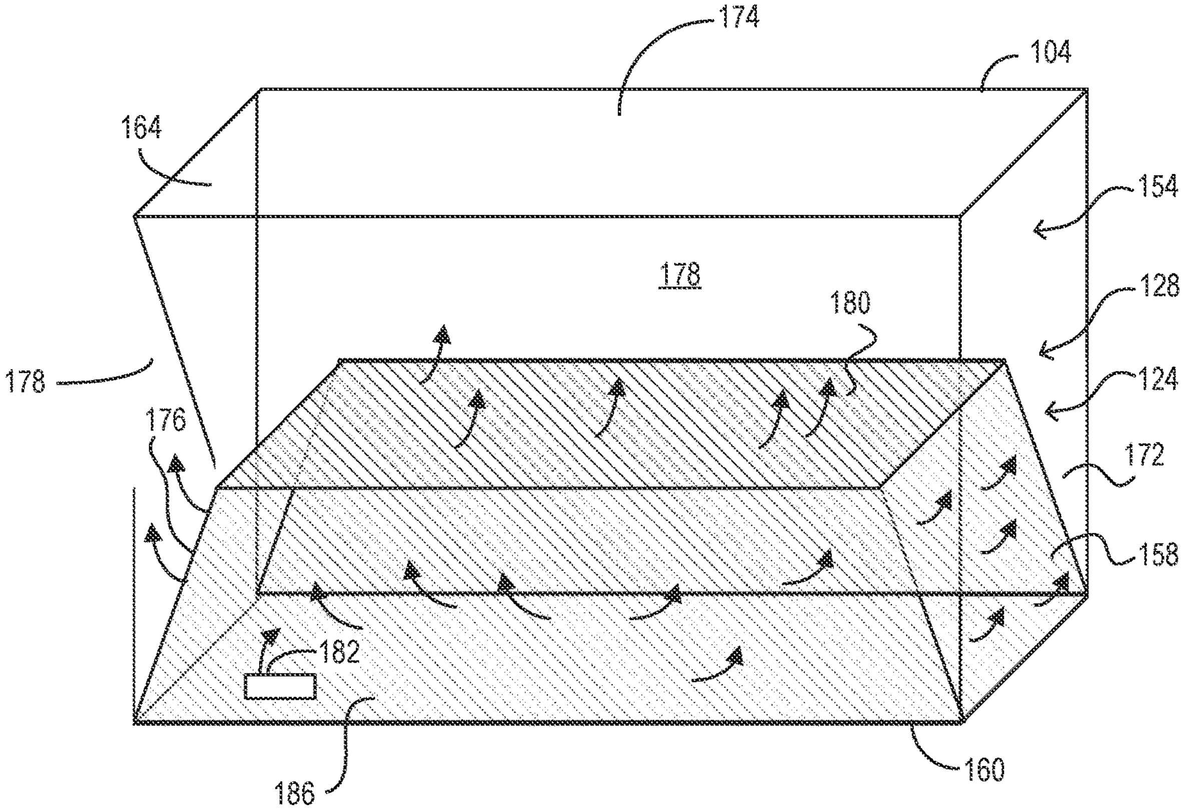
FIG. 7B is a schematic, perspective view of the momentum separator of FIG. 7A.

FIGS. 7A-7B exemplify a further alternative embodiment in which the momentum separator includes one or more screens (or porous sections) that are recessed from the momentum separator chamber walls. In this embodiment, the momentum separator 128 includes an end screen 158, as well as lateral screens 186. An advantage of this configuration is that air flow may exit through five different screens. Again, this may ensure that the velocity of the exiting air stream is minimized, which in turn, helps the dis-entrainment of air borne contaminants.

Figure 7C:
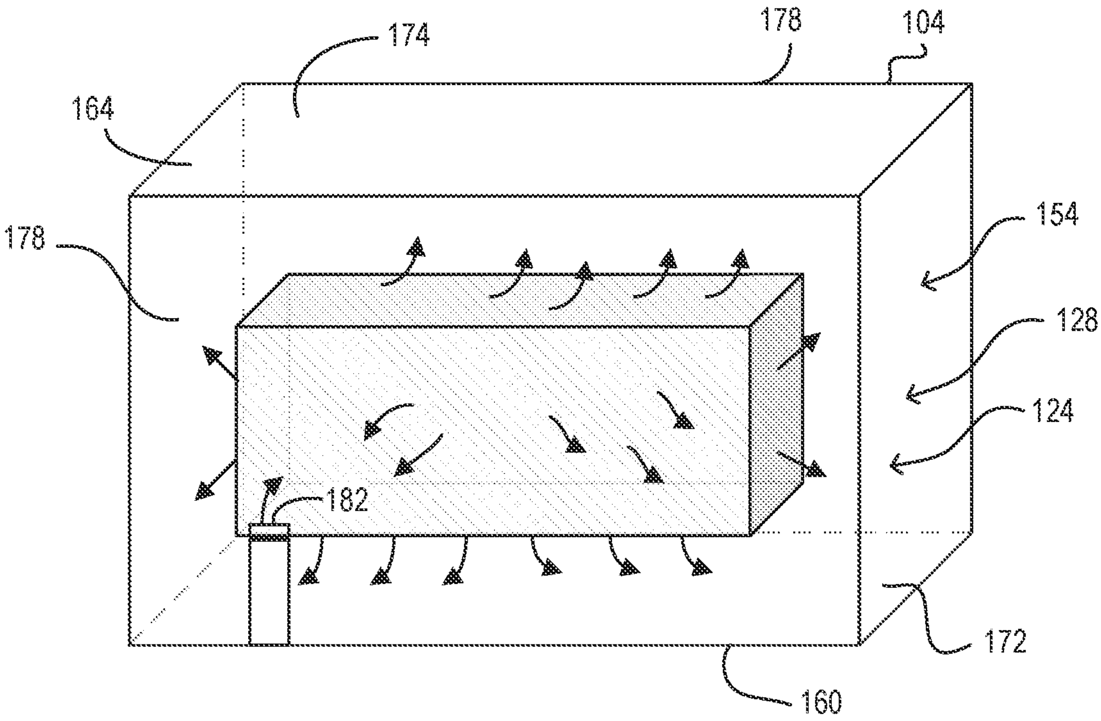
FIG. 7C is a schematic, perspective view of the momentum separator according to still yet another example embodiment.

FIG. 7C shows still a further alternative embodiment wherein air, incoming into the momentum separator 128, is bounded by screens from each side (i.e., 6 screens in total). The screens may be, for example, suspended inside of the momentum separator chamber. This configuration maximizes the surface area available for air to exit the momentum separator 128. Accordingly, the velocity of the air exiting the momentum separator 128 is reduced to a minimum, which generates optimal conditions for separation of air-borne dust and dirt.

It will be appreciated that the configurations illustrated in FIGS. 2-6, 7A-7C, and 19-22 have only been provided herein by way of example. In other embodiments, the momentum separator 128 may include any number or arrangement of porous wall sections and/or screens.

Figure 9:
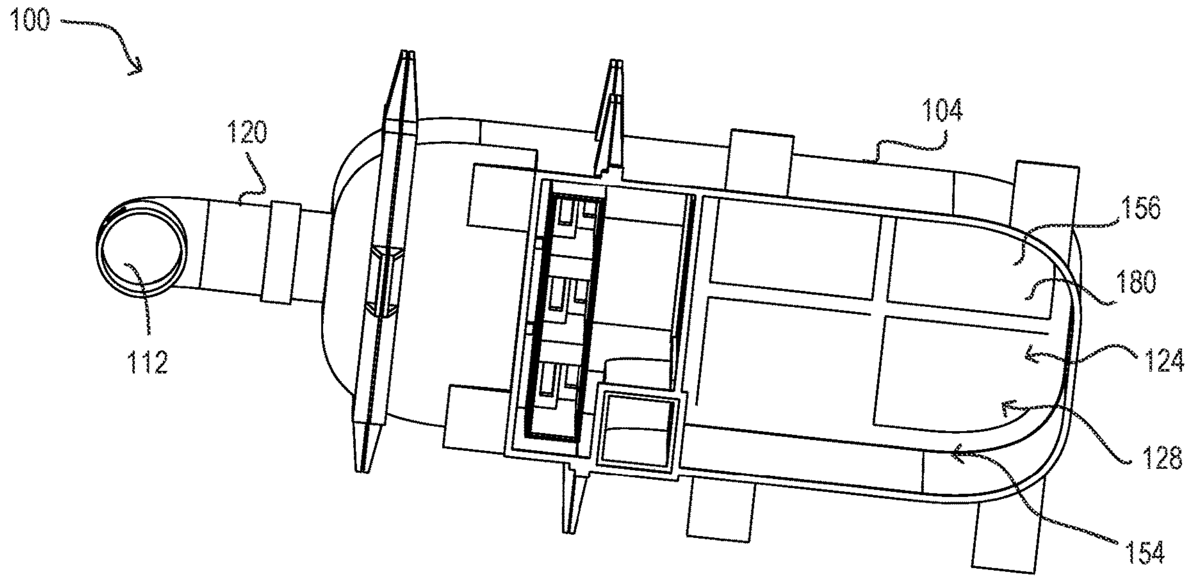
FIG. 9 is a perspective view from below of the air treatment apparatus of FIG. 1.

Referring now back to FIGS. 2-3 and 9, wherein the porous wall section is provided on a sidewall (e.g., side screen 176), an up flow chamber 188 can be provided for air exiting the momentum separator 128, through the side screen 176. The up flow chamber 188 is positioned between the side screen 176 and an end wall 192 (otherwise known as a blocking or facing wall) of the air treatment apparatus 100. Air entering the up flow chamber 188 flows upwardly in a plane parallel to the inlet conduit axis 140. In embodiments wherein the air treatment apparatus 100 includes a second stage separator 132, air that is carried through the upflow chamber 188 may flow downstream to the second stage separator 132. In this manner, the up flow chamber 188 acts as a conduit between the first stage separator 124 and the second stage separator 132. It will be appreciated that in other embodiments, chamber 188 may be oriented other than vertically.

Figure 11:
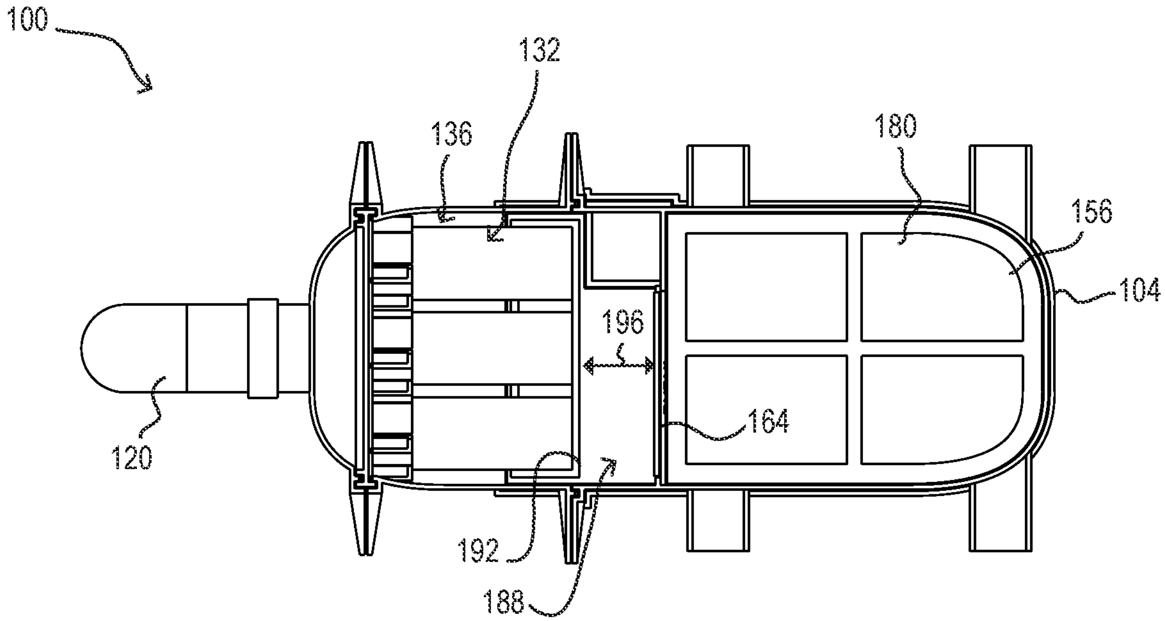
FIG. 11 is a top-down cross-sectional view along line 11-11' in FIG. 3 of the air treatment apparatus of FIG. 1.

As exemplified in FIG. 11, the end wall 192 may be laterally spaced from, and facing, the side screen 176 to form the up flow chamber 188. More specifically, a lateral spacing distance 196 separates the end wall 192 from the side screen 176. The lateral spacing distance 196 can be configured to be any suitable distance. In various embodiments, the lateral spacing distance 196 can be 2-40, 4-25, 8-15 or 10 $mm/m^3$ per minute of airflow. An advantage of using a smaller (or narrower) lateral spacing distance 196 is that a wind tunnel-like effect is generated inside the up flow chamber 188.

Accordingly, air entering the up flow chamber 188 may travel with increased speed downstream to the second stage separator 132. Alternatively, an advantage of using a larger (or widened) spacing distance 196 is that air entering the up flow chamber 188 may experience a reduction in velocity, which in turn, facilitates the separation of dust and other air borne debris from the incoming air stream, thereby allowing the passage to function as a momentum separator. Accordingly, the passage may comprise a second stage momentum separator and, in such a case, the momentum separator 128 may be considered a first stage or primary momentum separator. Also, in such an embodiment, chamber 188 may extend generally vertically to enable separated dirt to fall downwardly under the influence of gravity to collect on the bottom wall or floor of the chamber 188.

In embodiments wherein the upper wall 156 of the momentum separator 128 includes a top screen 180, air exiting through the top screen 180 may also flow into a side-flow chamber 208. As exemplified in FIGS. 6 and 19, the side-flow chamber 208 may be positioned between the top screen 180, the upper end wall (or upper portion) 174 of the housing body 104, and the end wall 172 of the housing body 104. Air entering the side flow chamber 208 deflects off of the upper wall 174 and the end wall 172 and is directed laterally towards a further downstream air treatment member.

Figure 6:
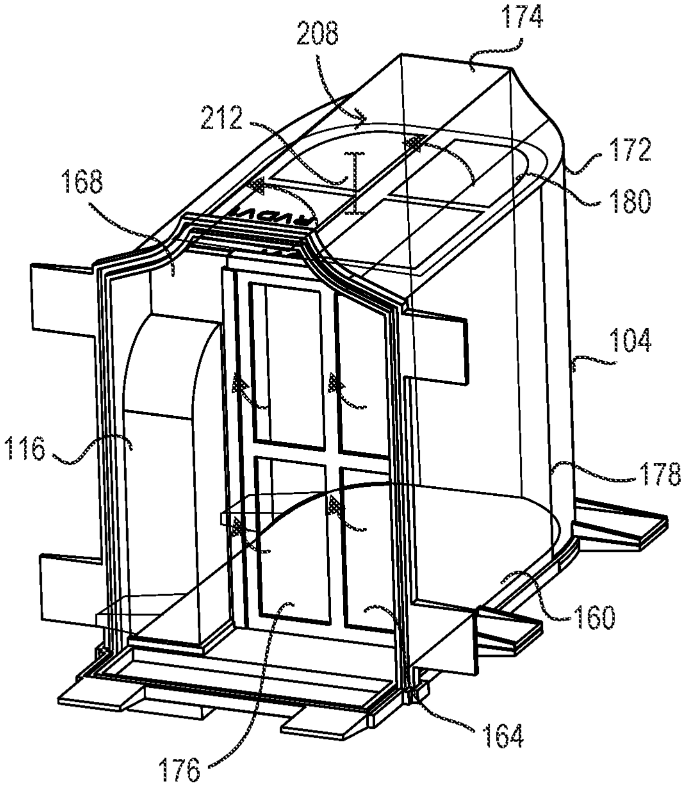
FIG. 6 is another perspective view of the momentum separator according to an example embodiment.

In various cases, as best exemplified by FIG. 6, the upper wall 174 of the housing body 104 faces, and is vertically spaced from, the top screen 180 by a vertical spacing distance 212 to form the side-flow chamber 208. Similar to the lateral spacing distance 196, the vertical spacing distance 212 can be any suitable distance, such as 2-40, 4-25, 8-15 or 10 $mm/m^3$ per minute of airflow. A smaller vertical spacing distance 212 may tend to induce a wind tunnel like effect that results in an increase in airflow velocity inside of the side-flow chamber 208. Conversely, a wider (or larger) vertical spacing distance 212 may induce a reduction in air stream velocity, which in turn, may help separate particles of dust and dirt from the airflow.

Figure 10:
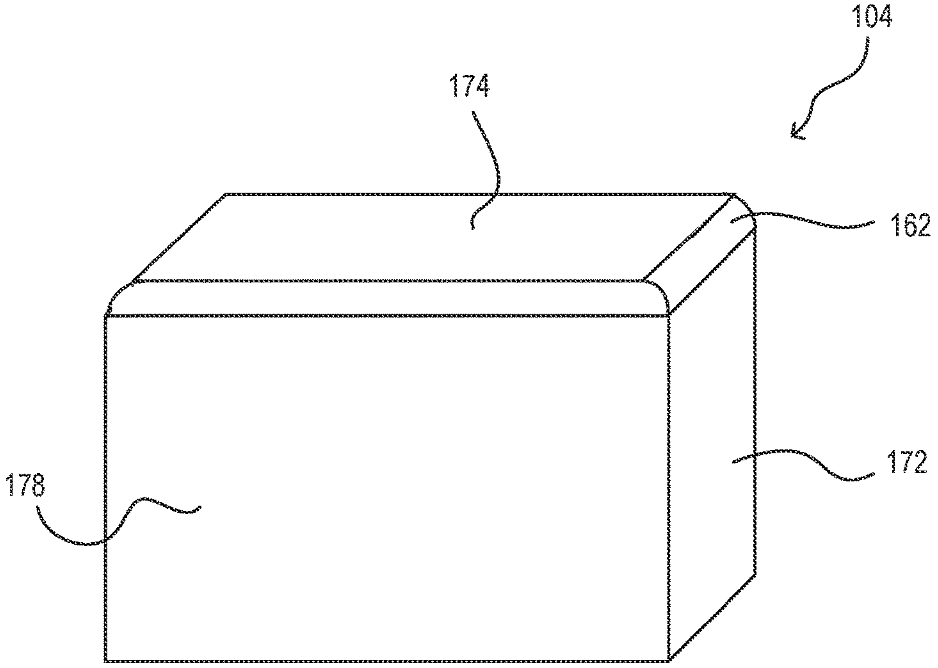
FIG. 10 is a schematic, perspective view of a housing body for the momentum separator according to an alternative example embodiment.

Referring to FIG. 10, there is shown an alternative embodiment of a portion of the housing body 104 that surrounds the momentum separator 128. In this example, the housing body 104 includes rounded edges or corners 162, which facilitate smoother flow of air inside side-flow chamber 208.

Momentum Separator with a Generally Horizontal Air Inlet

Optionally, as exemplified in FIGS. 2-6, a momentum separator as discussed herein may have a momentum separator air inlet 182 that directs an air flow to enter the momentum separator generally horizontally. Alternately, or in addition, the momentum separator air inlet 182 may be provided external to the momentum separator chamber 154. Accordingly, as exemplified in FIGS. 2-6, momentum separator air inlet 182 may be provided in an upwardly extending sidewall that provides all or part of the air outlet of the momentum separator (e.g., part or all of sidewall 164 may be a screen 176).

The momentum separator may be used in a surface cleaning apparatus, such as a robotic surface cleaning apparatus or a hand vac. The momentum separator may use any of the features and/or dimensions of momentum separator 128 and is also exemplified herein as part of a docking station.

As the air stream enters momentum separator chamber 154, the velocity of the air stream may decrease and entrained dirt will fall towards the bottom of the momentum separator chamber 154.

Optionally, the wall opposed to the wall having the momentum separator air inlet 182 (e.g., end wall 172) may be solid. Therefore, air entering the momentum separator chamber 154 cannot continue in a generally linear direction but must change direction and exit the momentum separator chamber 154 on the same side as it entered the momentum separator chamber 154. Accordingly, the air stream will undergo a 180° change in direction that will further enhance the extent to which entrained dirt will become dis-entrained.

As exemplified in FIG. 3, the sidewall 164 includes an inlet portion 168. The inlet portion 168 includes a momentum separator air inlet 182, which is configured to receive air from the inlet conduit 116. In the illustrated embodiment, the momentum separator air inlet 182 is the same as the outlet port 152 of the inlet conduit 116. In other embodiments, the outlet port 152 may be separate from the momentum separator air inlet 182, for example if an upstream air treatment member is provided.

The momentum separator air inlet 182 is optionally situated at an elevated section of the inlet portion 168 along the sidewall 164 (e.g., above the midpoint, in the upper third, or in the upper quarter of the sidewall 164). Accordingly, air enters into the momentum separator 128 from a raised position above any dirt that may have collected in the momentum separator chamber 154 (provided the momentum separator chamber 154 has been emptied when a fill line has been reached) and will therefore tend to not re-entrain dirt that has already been collected. Upon entry to the momentum separator chamber 154, the air stream will experience a reduction in velocity, which facilitates the separation of air borne dust and dirt from the airflow. In various embodiments, air entering the momentum separator 128 may experience a reduction of velocity by as much as 25 to 100 times the original velocity of the air as it exits the outlet port 152 and/or the momentum separator air inlet 182. Dust and dirt, which becomes dis-entrained from the airflow inside of the momentum separator 128, i.e., as a result of the velocity reduction, may collect on top of the lower wall 160 of the momentum separator 128.

In the example embodiment shown in FIGS. 2 and 3, the downstream end 148 of the inlet conduit 116 is curved to re-direct airflow, into the momentum separator chamber 154, in a generally horizontal direction towards the end wall 172 of the housing body 104. To this end, the momentum separator air inlet 182 may extend in a plane that is generally parallel to the end wall 172.

Figure 4A:
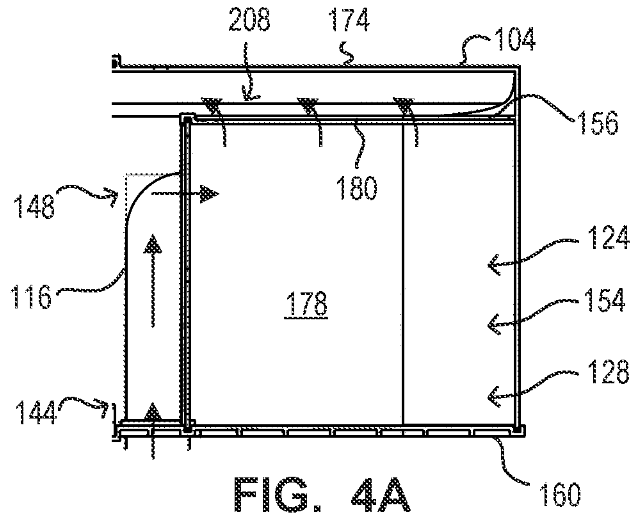
FIG. 4A is a side cross-sectional view along line 2-2' in FIG. 1 of a momentum separator located inside of the air treatment apparatus of FIG. 1, according to some embodiments.

FIG. 4A shows an alternative embodiment of the downstream end 148. In this embodiment, rather than being curved, the downstream end 148 is configured with a sharp right degree angle. An advantage of this configuration is that the airflow experiences an abrupt change in direction, which may result in a further reduction in airflow velocity. The reduction in airflow velocity may facilitate separation of air-borne dust and debris from the air stream.

Figure 4B:
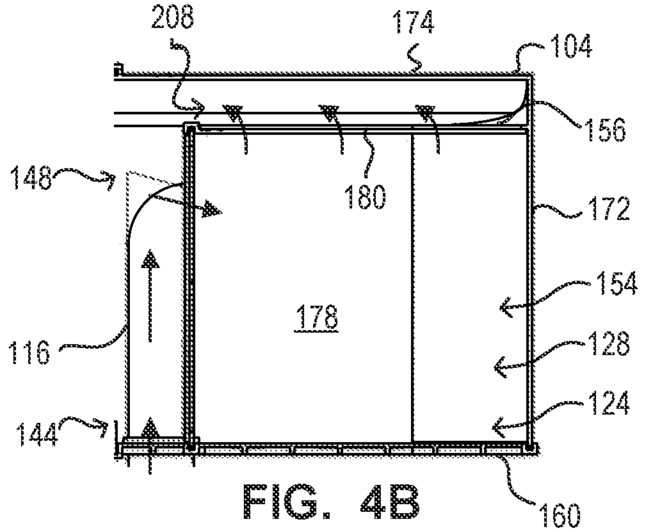
FIG. 4B is a side cross-sectional view along line 2-2' in FIG. 1 of the momentum separator according to some other embodiments.

FIG. 4B shows a further alternative embodiment for the downstream end 148. In this case, the downstream end 148 is downwardly sloped and is configured to re-direct air into the momentum separator 128 in a generally horizontal and downward direction, i.e., towards the mid or lower portion of end wall 172. In this embodiment, the airflow experiences an even more abrupt change in flow direction, which, accordingly, may result in a further reduction in the air stream velocity. This may again help to facilitate the separation of air-borne dust and debris from the airflow.

Figure 4C:
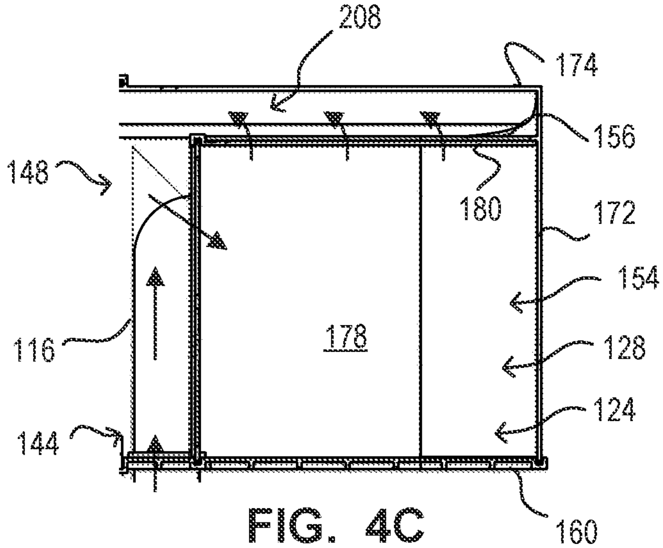
FIG. 4C is a side cross-sectional view along line 2-2' in FIG. 1 of the momentum separator according to still other embodiments.
Figure 5:
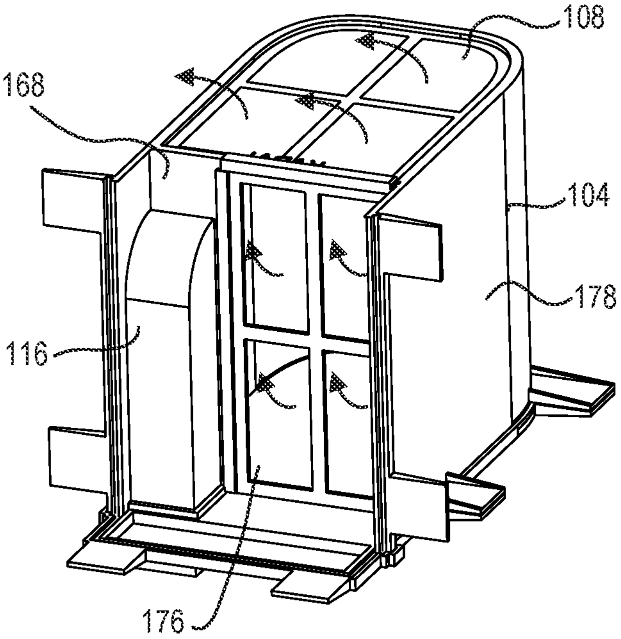
FIG. 5 is a perspective view of the momentum separator of FIG. 3.

FIG. 4C shows still yet a further alternative embodiment for the downstream end 148. In this alternative embodiment, the downstream end 148 is now increasingly downwardly sloped and is configured to re-direct air in a generally downward direction. As such, the air stream experiences yet a more extreme reduction in flow velocity, which may further facilitate the process of dis-entraining air-borne dust and debris therefrom.

In other embodiment not shown, the downstream end 148 may be configured to re-direct air entering the momentum separator 128 in any one of a number of other suitable directions (for example, generally horizontally and upwardly, etc.)

Momentum Separator with a Vertical Air Inlet

Optionally, as exemplified in FIGS. 19-28, a momentum separator as discussed herein may have a momentum separator air inlet 182 that directs an air flow to enter the momentum separator generally vertically. Alternately, or in addition, the momentum separator air inlet 182 may be provided internal to the momentum separator chamber 154.

The momentum separator may be used in a surface cleaning apparatus, such as a robotic surface cleaning apparatus or a hand vac. The momentum separator may use any of the features and/or dimensions of momentum separator 128 and is also exemplified herein as part of a docking station.

As exemplified in FIGS. 19-28, optionally, the inlet conduit 116 may extend upwardly and in a generally vertical direction, along inlet conduit axis 140, and at least partially into the momentum separator 128. In this configuration, air may exit the conduit 116, via the outlet port 182, in a generally upward or vertical direction. In other cases, the inlet conduit outlet port 356 may be configured to direct the dirty air into the momentum separator chamber 360 in any suitable direction As further exemplified, optionally, if the air exits outlet port 182 vertically or generally vertically, then a deflecting member (or deflector) 388 may be provided, e.g., on the upper wall 156. The deflecting member 388 is preferably positioned such that an incoming stream of dirty air, exiting the outlet port 182, impacts the deflector 388. The air stream is accordingly forced to change direction quickly, and in turn, experience a sudden reduction in velocity. This may help to facilitate separation of solids and other air-borne debris from the incoming stream of air. In addition, if the upper wall 156 comprises or consists of a screen, then the deflector may prevent the incoming air stream being directed directly at the screen.

The deflector 388 may have any suitable shape. In the illustrated embodiment, the deflector 388 has a generally concave shape (see FIGS. 21 and 22) which re-directs incoming airflow in a direction that is generally horizontal and downward.

Single Cyclone

The following is a description of a single cyclone that may be used by itself or in combination with other air treatment members in a docking station as exemplified herein, or which may be used by itself or in combination with other air treatment members in a surface cleaning apparatus. Accordingly, as exemplified in FIGS. 32A-32D and 33A-33B, a cyclone or cyclone unit 502 may be used in place of the momentum separator 128 discussed previously herein. Accordingly, the first stage separator 124 may comprise or consist of a first cyclone stage, and, if provided, the second stage separator 132 may define a second cyclone stage (e.g., cyclone array 136).

As exemplified, cyclone 502 may include a cyclone bin assembly 504 comprising a cyclone chamber 506 and a separate dirt collection chamber 508. Dirt collection chamber 508 is external to the cyclone chamber 506 and is in communication with the cyclone chamber 506, via a dirt outlet 510, to receive dirt and debris exiting the cyclone chamber 506. Cyclone chamber 506 includes an air inlet 182 for receiving a flow of dirty air, and an air outlet 518 through which clean air may exit the chamber 506.

As exemplified, cyclone chamber 506 may also include a cyclone chamber side wall 580 which extends between the first and second cyclone ends. In some cases, lateral walls 178 and end wall 172 may define the cyclone chamber sidewall 580 (e.g., FIGS. 32A-32D). In other cases, the cyclone chamber 506 may include a separate cyclone sidewall 580, which is recessed inwardly from lateral walls 178 and end wall 172 (e.g., FIG. 33A).

Cyclone chamber 506 extends along cyclone axis of rotation 550 between a first cyclone end **506*a* and a second cyclone end 506*b* and may be of various designs and orientations. In the embodiment exemplified in FIGS. 32A-32D, upper wall 156 may define the first cyclone end 506*a*, while lower wall 160 may define the second cyclone end 506*b*. Accordingly, with the upper wall 156 is positioned over the lower wall 160, the cyclone axis 550 may be oriented generally vertically. However, in other cases, the cyclone axis 550 may be oriented in any other direction. For example, the cyclone axis 550** may be vertically offset (e.g., ±20°, ±15°, ±10°, or ±5° from the vertical).

The dirt outlet 510 may have any suitable shape or configuration. For instance, in the embodiment exemplified in FIGS. 32B-32D, the dirt outlet 510 may comprise one or more openings (e.g., slots or perforations) formed on separating wall **376*a***.

Figure 33A:
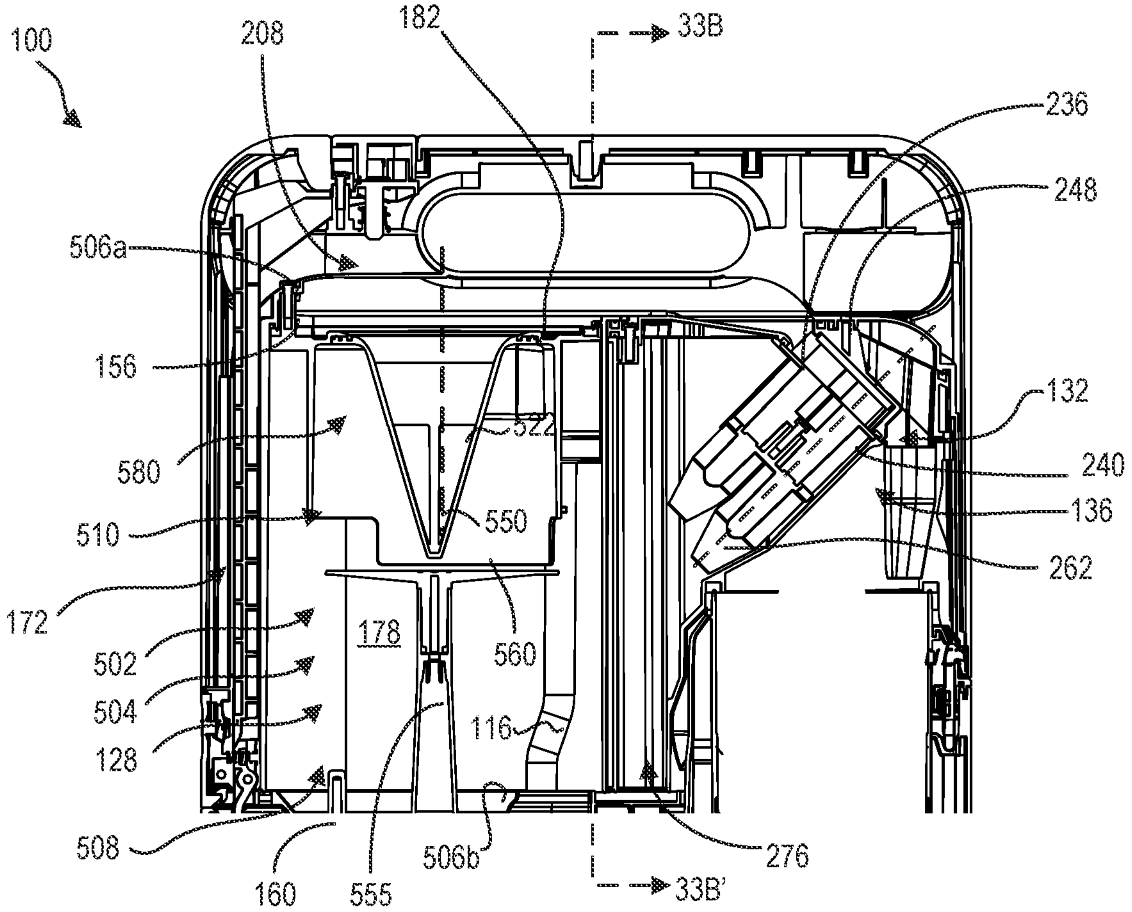
FIG. 33A is a cross-sectional view along line 32B-32B' in FIG. 32A of the air treatment apparatus of FIG. 32A according to another example embodiment; and, FIG. 33B is a cross-sectional view along line 33B-33B' in FIG. 33A of the air treatment apparatus of FIG. 33A.
Figure 33B:
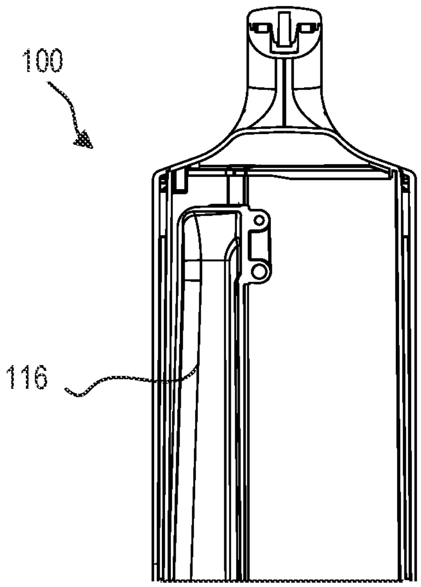

In the embodiment of FIG. 33A-33B, a plate 560 or lower wall 560 is supported spaced from the lower wall 160 by a support member 555, which may extend generally parallel to cyclone axis 550. In other cases, the plate 560 may be supported inside of the housing 104 in any other manner known in the art. As exemplified, the dirt outlet 510 may be formed as a gap between the plate 560 and cyclone chamber sidewall 580.

FIGS. 32A-32D exemplify an embodiment wherein cyclone 502 is configured as a uniflow cyclone (e.g., a cyclone with unidirectional airflow). In this configuration, air inlet 182 and air outlet 518 are positioned at axially opposite ends of the cyclone chamber 506. In the exemplified embodiment, air inlet 182 is located proximal the second cyclone end **506*b* (e.g., lower wall 160), while air outlet 518 is located at the first cyclone end 506*a* (e.g., upper wall 156) 368. In this embodiment, the dirt outlet 510** is provided at the upper end of the cyclone chamber.

FIGS. 33A-33B exemplify an alternate configuration wherein the cyclone air inlet 182 and air outlet 518 are positioned at the same end of the cyclone chamber 506 (e.g., proximal the first cyclone end **506*a*). In this embodiment, the dirt outlet 510** is provided in a lower end of the cyclone chamber.

In various cases, the cyclone chamber 506 can also be configured as an inverted cyclone. In other words, dirty air may enter from the bottom of the cyclone chamber 506 and exit from the lower end of cyclone chamber 506.

Cyclone air inlet 182 and air outlet 518 may have any suitable configuration. For instance, in the exemplified embodiments, air inlet 182 comprises a tangential opening on the cyclone sidewall 580, while cyclone air outlet 518 may be defined by an opening on the top wall 156 and may comprise an outlet passage 524.

Optionally, a screen 512 may be positioned over the cyclone air outlet 518. Screen 512 may help to prevent dirt and debris (e.g., hair, larger particles of dirt) from exiting cyclone chamber 506 via the air outlet 518. As exemplified, screen 512 can include one or more air permeable regions 514, which permit the flow of air through the screen 512 to the air outlet 518. The permeable regions 514 can comprise, for example, a mesh material. In some cases, the mesh material may be self-supporting (e.g., metal mesh). In other cases, non-permeable frame members 516 can be used as support frame for the mesh material. The non-permeable frame members 516 may surround the permeable regions 514.

Figure 32A:
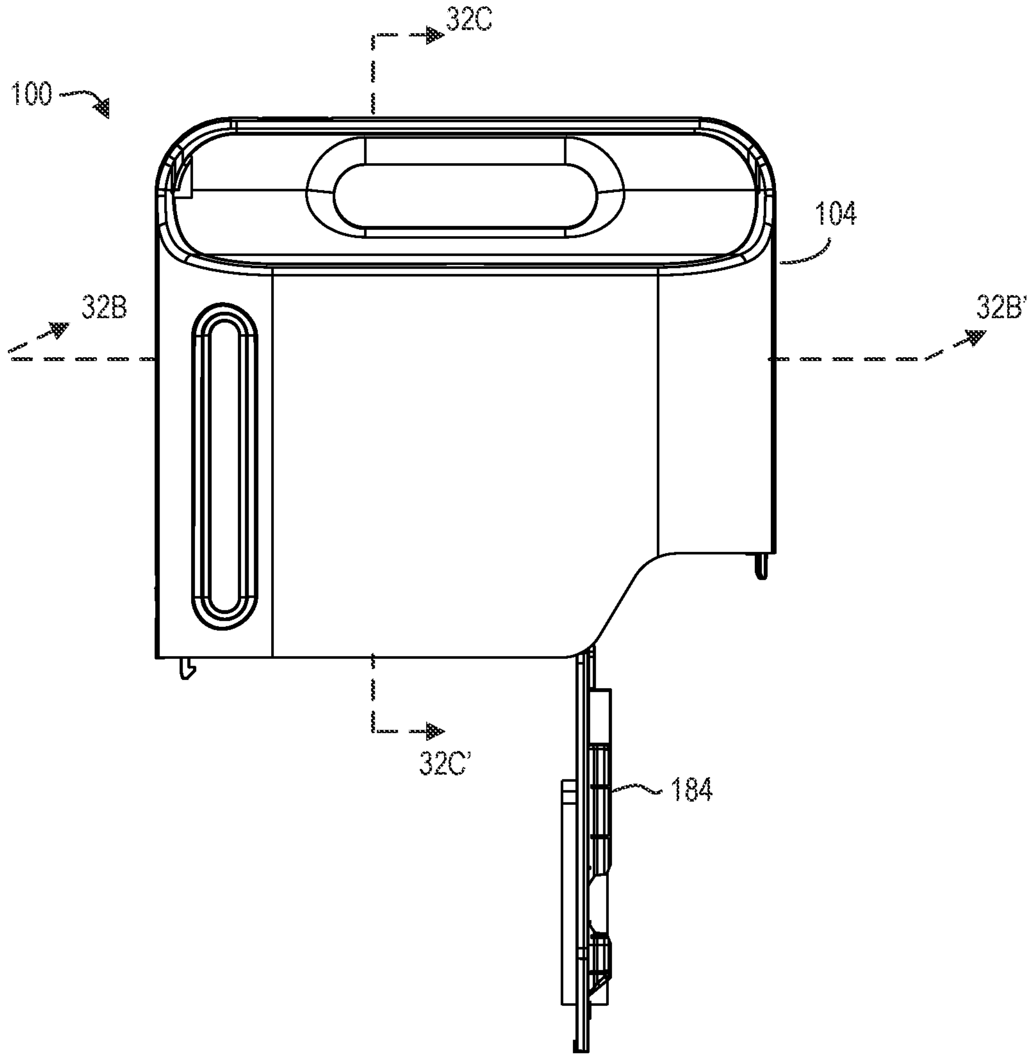
FIG. 32A is a side elevation view of another embodiment of the air treatment apparatus with a bottom door in an open configuration.
Figure 32B:
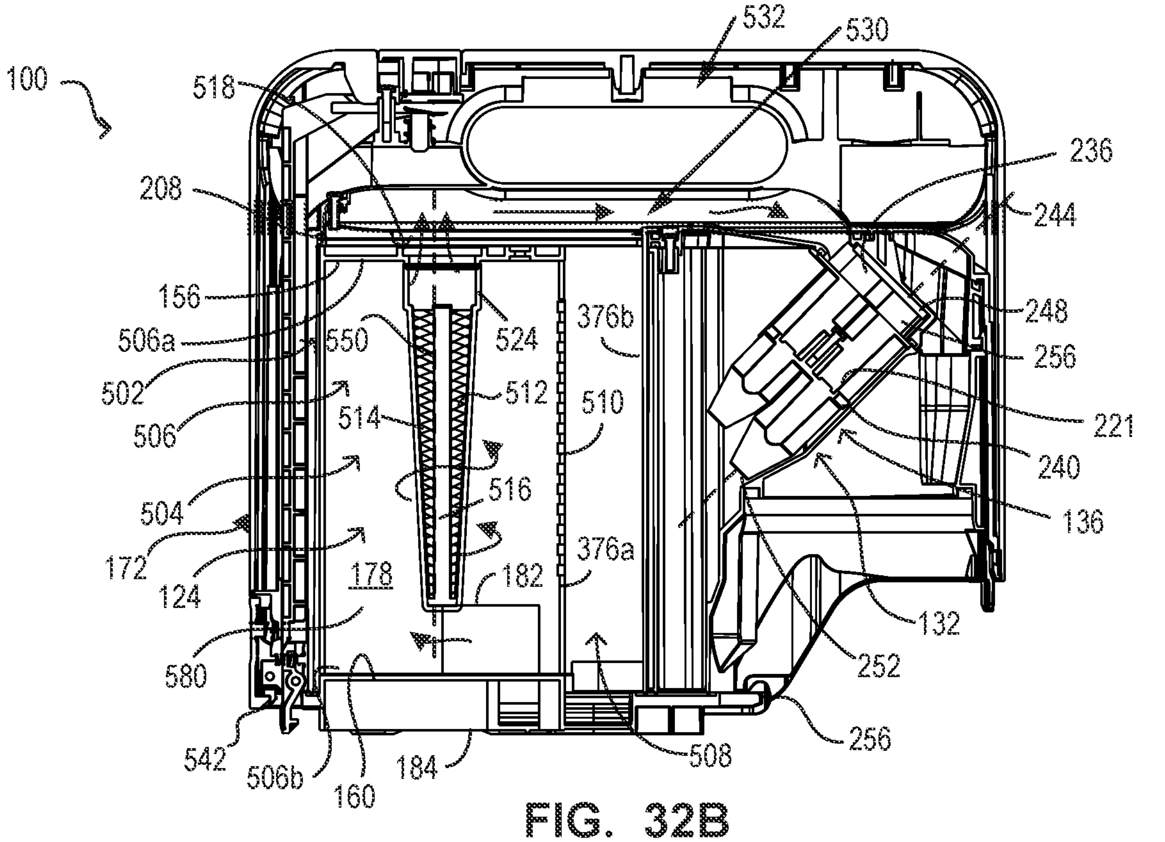
FIG. 32B is a cross-sectional view along line 32B-32B' in FIG. 32A of the air treatment apparatus of FIG. 32A with the bottom door in a closed configuration.
Figure 32C:
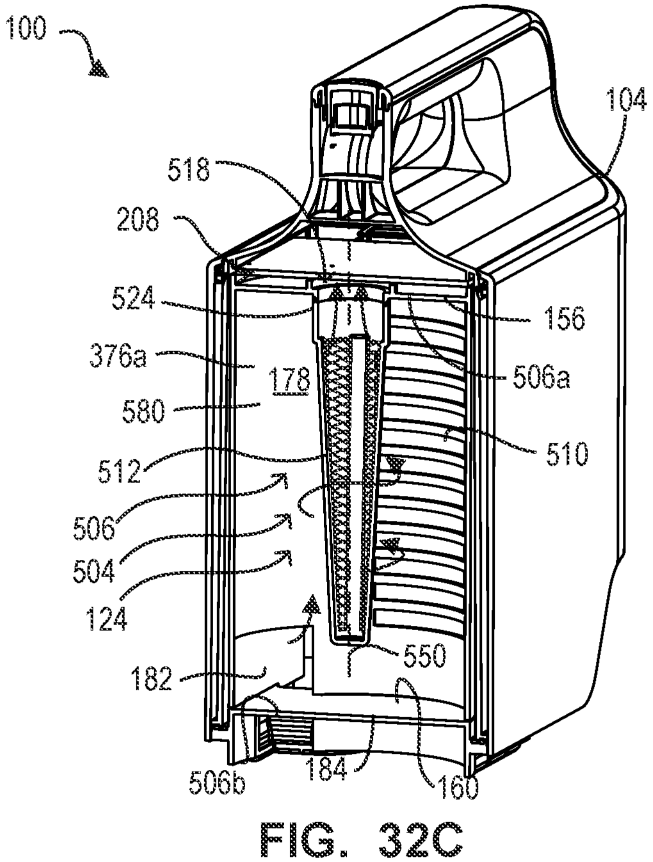
FIG. 32C is a cross-sectional view along line 32C-32C' in FIG. 32A of the air treatment apparatus of FIG. 32A with the bottom door in the closed configuration.

In the exemplified embodiment of FIGS. 32B-32C, the screen 512 is configured as a generally frusto-conical shaped member. In other cases, the screen 512 may be configured as a conical shaped member (FIGS. 33A-33B), or may have any other suitable shape (e.g., cylindrical).

In operation, dirty air may flow into the cyclone chamber 506 via the air inlet 182 and cyclonically flow inside cyclone chamber 506 about cyclone axis 550. Air may then exit the cyclone chamber 506 from the air outlet 518. In the exemplified embodiments, air exiting the cyclone chamber 518 may enter the side flow chamber 208 and continue toward the second (downstream) stage separator 132 (e.g., cyclone array 136).

As cyclonic flow is induced inside of cyclone chamber 506, dirt may be ejected from the cyclone chamber 506 into the dirt collection chamber 508, via the dirt outlet 510.

Figure 32D:
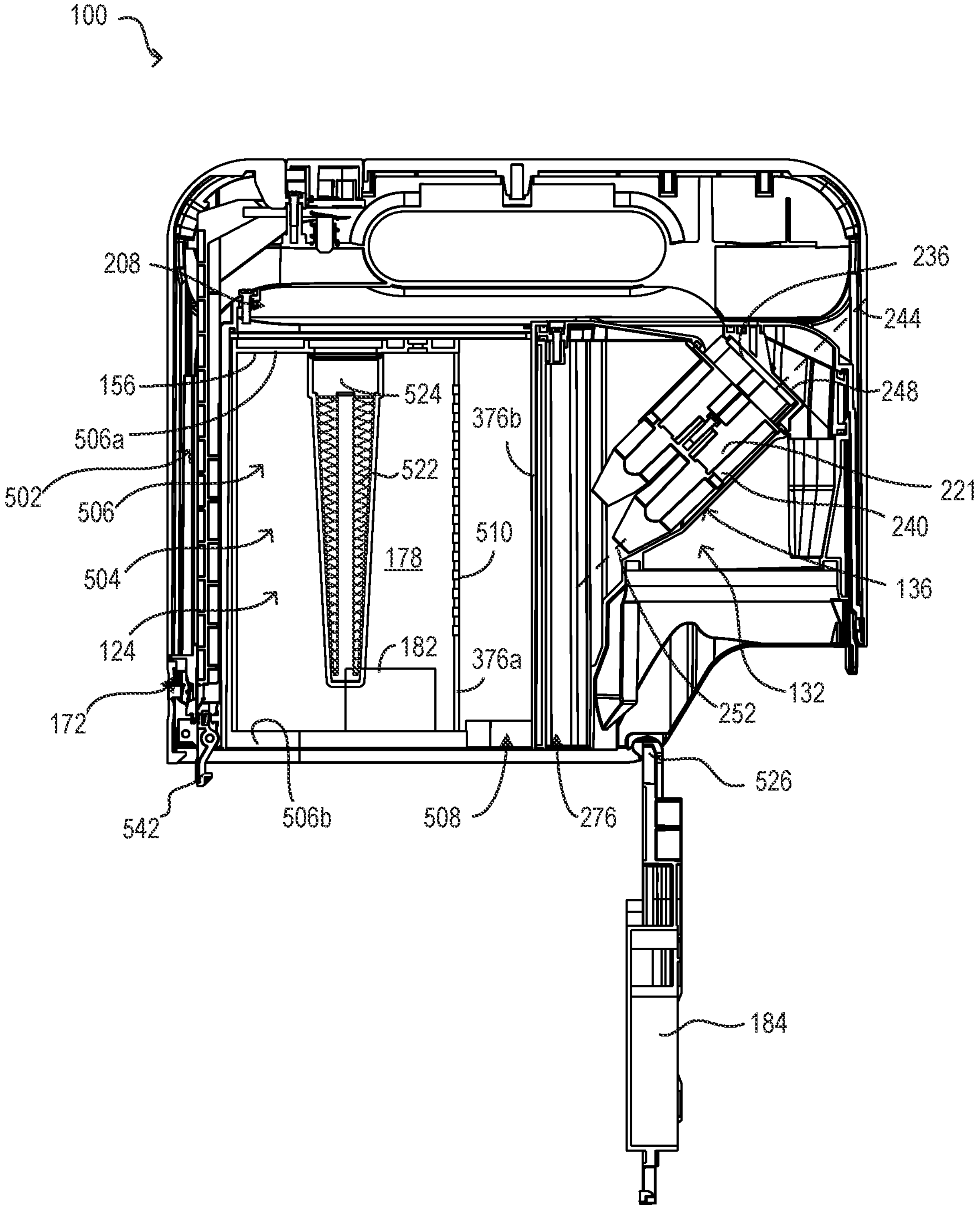
FIG. 32D is a cross-sectional view along line 32B-32B' in FIG. 32A of the air treatment apparatus of FIG. 32A with the bottom door in the open configuration.

FIGS. 32B-32D exemplify a first embodiment of the dirt collection chamber 508. In this embodiment, the dirt chamber 508 is provided externally to the cyclone chamber 506. As exemplified, the dirt collection chamber 508 is located between a first partition wall 376*a* and a second partitioning wall 376*b*. The first partition wall 376*a* separates dirt chamber 508 from the cyclone chamber 506. Second partition wall 376*b* separates dirt chamber 508 from dirt chamber 276 of the second stage cyclone array 136. In some cases, as exemplified in FIG. 32C, the first partition wall 376*a* may comprise a portion of the cyclone sidewall 580. As exemplified, the dirt chamber 508 extends generally parallel to cyclone axis 550, and spans the axial length of cyclone chamber 506. In other embodiments, the dirt chamber 508 may extend only part of the way along the axial length of cyclone chamber 506 and/or may be oriented at an angle to the cyclone axis 550. In still other cases, the dirt chamber 508 may be located at any other suitable location relative to cyclone chamber 506. For instance, as exemplified in FIG. 33A, the dirt chamber 508 may be located axially below the cyclone chamber 506. In this configuration, dirt particles may fall by gravity into dirt collection chamber 508.

Cyclone Array

The following is a description of a cyclone array that may be used by itself or in combination with one or more additional air treatment members that may be located upstream and/or downstream from the cyclone array. The cyclone array may be used in a surface cleaning apparatus, such as a robotic surface cleaning apparatus or a hand vac or a docking station. The cyclone array is exemplified herein as part of a docking station.

In accordance with this aspect some, and preferably all, of the cyclones in a cyclone array have a dirt outlet that is positioned such that dirt exiting the dirt outlet is not directed towards another cyclone in the array. Accordingly, dirt exiting the cyclone array may travel unimpeded to a dirt collection chamber. Optionally, this design is utilized when the cyclones have a cyclone axis of rotation that is at an angle (non-zero angle) to the vertical, such as about 75°, 60°, 45° (e.g., as exemplified in FIGS. 32B and 33A), 30°, 15° or 0° (i.e., generally horizontal as exemplified in FIGS. 12 to 13) in operation. Accordingly, if the dirt outlet is provided in a sidewall of the cyclone, the dirt outlet may directly face the floor of a dirt collection chamber or a passage to a dirt collection chamber (i.e., no significant intervening structure is located between the dirt outlet and the floor of a dirt collection chamber or a passage to a dirt collection chamber). This may be achieved by shortening some of the cyclones as exemplified in FIGS. 16 and 30 such that a dirt outlet end of an upper cyclone does not overlie a lower cyclone or staggering the cyclones in the direction of the cyclone axis of rotation such that an upper cyclone does not overlie a lower cyclone.

Alternately, or in addition, in accordance with this aspect the cyclone array may be configured to enable air to flow between or along the cyclones. For example, a plurality of housings 216 may be provided wherein each housing has, e.g., 2 or more cyclones, and the housings 216 are spaced apart from each other to enable air to flow therebetween. Alternately, the cyclone may themselves be spaced apart to enable air to flow therebetween.

The cyclones may be provided in a single housing such that a single manifold or header distributes air to each of the cyclones. Alternately, a plurality of such headers may be provided. In the embodiment of FIGS. 2 and 3, a single header 296 is provided. The header may be upstream from a single airflow path from, e.g., momentum separator 128. Alternately, as optionally exemplified in FIGS. 12 to 13, a plurality of flow paths may be provided from up flow chamber 188 and side-flow chamber 208 to the header 296.

Referring to FIGS. 2-17 and FIGS. 19-28, as exemplified, the second stage separator 132 may comprise a cyclone array 136. The cyclone array 136 may include one or more cyclones 221. For instance, cyclone array 136 may include six cyclones (FIGS. 2-17), or ten cyclones (FIGS. 19-28).

Each cyclone 221 may include a cyclone chamber 260 that extends, along a cyclone axis of rotation 244, between a first cyclone end 248 and an axially opposed second cyclone end 252. The axial extension between the first cyclone end 248 and the second cyclone end 252 defines the axial length 280 of the cyclone. A cyclone sidewall 270 may extend between the first and second cyclone ends.

As discussed previously, the cyclone axis of rotation 224 may be oriented in various directions. For instance, FIGS. 2-17 exemplify an embodiment wherein each cyclone 221 has a cyclone axis 224 that is oriented generally horizontally. In other words, the first cyclone end 248 is positioned forward of the second cyclone end 252. FIGS. 32B-32D exemplify a further embodiment wherein each cyclone has a cyclone axis 224 that is oriented at an angle to the horizontal plane (e.g., a 45°). FIGS. 19-28 exemplify still a further alternative embodiment wherein each cyclone 221 has a cyclone axis 224 that is oriented generally vertically. In this embodiment, the first cyclone end 248 is positioned on top of the second cyclone end 252.

While the exemplified embodiments illustrate each cyclone 221, in the cyclone array 136, as being oriented in the same direction, and in a generally parallel configuration, in other cases, different cyclones 221 in cyclone array 136 may have cyclone axis oriented in different directions.

Each cyclone unit 221 may have one or more air inlets 256 for receiving a flow of air, and a cyclone outlet 264 for an outflow of air.

Figure 16B:
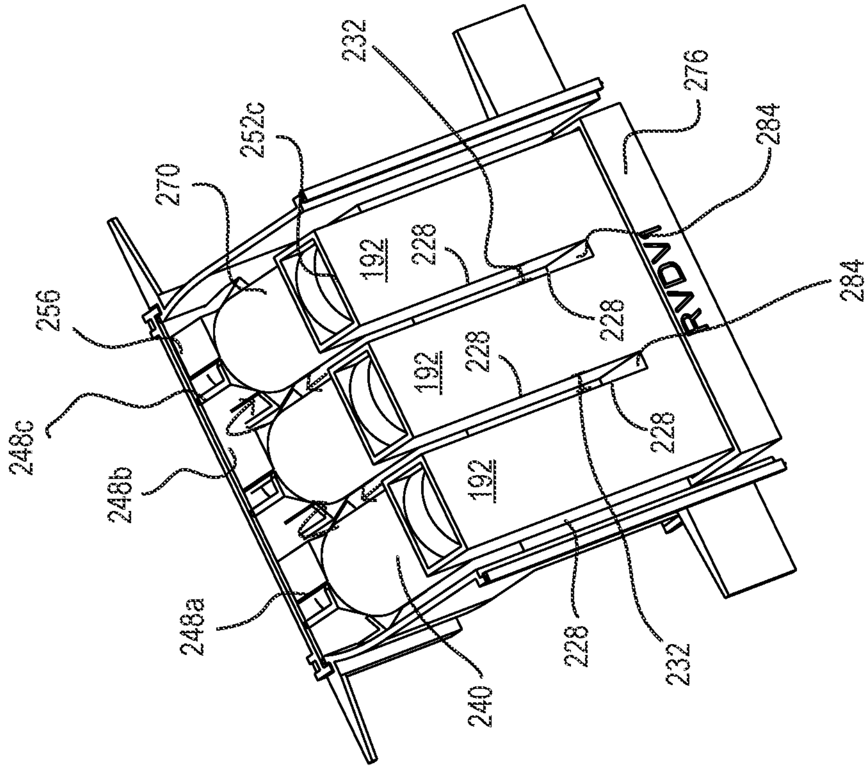
FIG. 16B is a partially cut away rear perspective view of the cyclone array of FIG. 12.
Figure 16A:
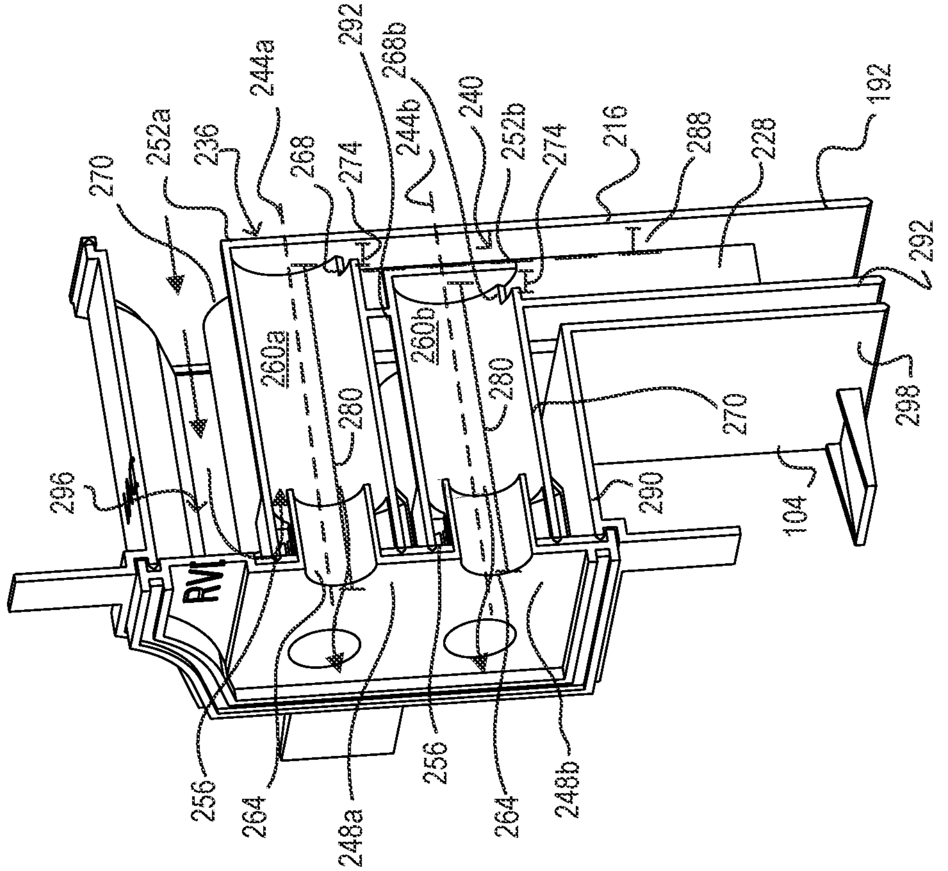
FIG. 16A is a perspective side cross-sectional view along line 2-2' in FIG. 1 of the cyclone array of FIG. 12.
Figure 16C:
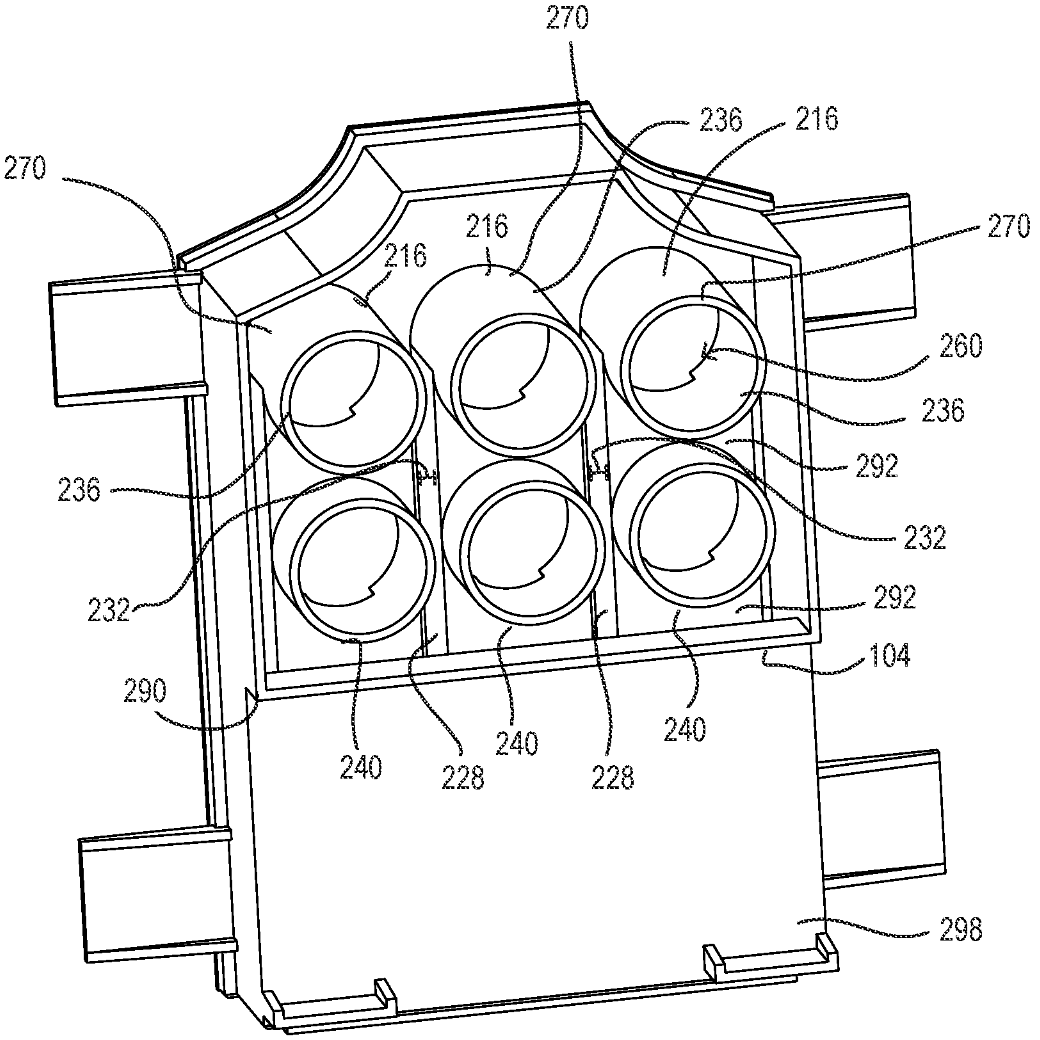
FIG. 16C is a vertical cross-sectional view along line 14-14 in FIG. 12 from the rear of the cyclone array of FIG. 12.
Figure 17:
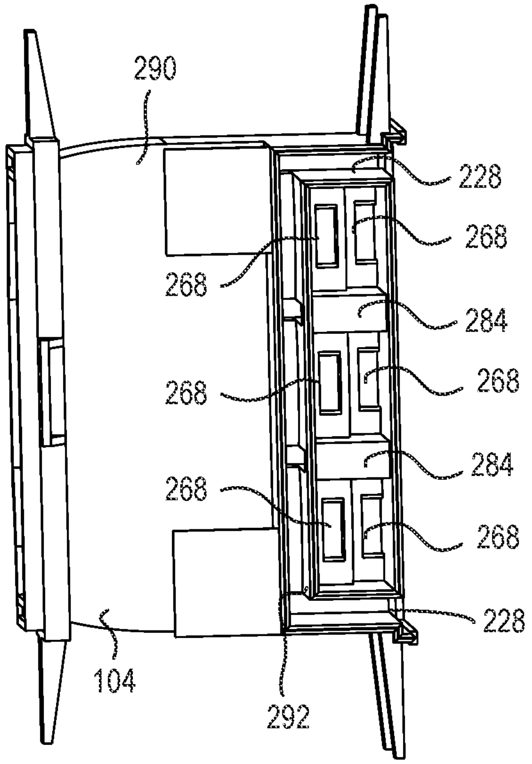
FIG. 17 is a bottom-up cross-sectional view along line 17-17' in FIG. 13 of the cyclone array of FIG. 12.

The cyclone air inlets 256 and air outlet 264 may be located at any suitable position along the axial length of each cyclone 221. In the exemplified embodiments, the air inlet 256 and air outlet 264 are positioned at the first cyclone end 248 (FIG. 16A). In other cases, however, the cyclone unit

221 may be configured as a uniflow cyclone, whereby the inlet 256 and outlet 264 are positioned at opposite axial ends of the cyclone chamber 260.

The cyclone air inlet 256 and outlet 264 may also have any suitable shape or configuration. For instance, as exemplified, each cyclone air inlet 256 may comprise a tangential inlet, and the cyclone 221 may include one or more air inlets 256 positioned circumferentially around the outer perimeter of the cyclone unit 221. The cyclone air outlet 264 may comprise a central opening located in the first cyclone end 248, and may be surrounded by the one or more air inlets 256.

Figure 27:
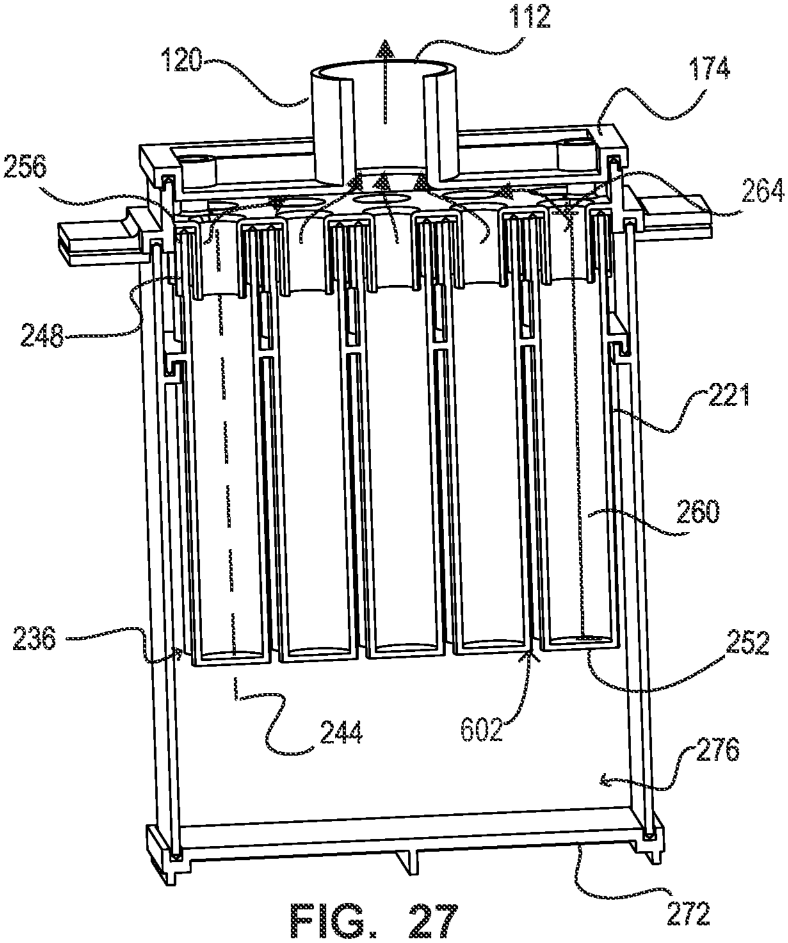
FIG. 27 is a cross-sectional view along line 27-27' in FIG. 26 of the cyclone array of FIG. 26.

In operation, as exemplified in FIGS. 16 and 27, dirty air flows into the cyclones 221 via air inlets 256, and enters the cyclone chamber 260. Inside of the cyclone chamber 260, air is induced to swirl around the cyclone axis 244, which in turn, facilitates the separation of the finer particles of dust and debris from the airflow. Cleaner air exits the cyclone chamber 260 via the cyclone air outlet 264. Air which exits through the air outlet 264 may continue downstream to the air treatment apparatus air outlet 120, and in some cases, may continue further downstream to a suction device (i.e., a suction motor 324 of FIG. 18) in communication with the air outlet 120.

Dirt and debris, which becomes separated from the airflow inside of the cyclone chamber 260, exits the cyclone through one or more dirt outlets 268. In the exemplified embodiments, the dirt outlets 268 are provided at the second cyclone end 252, and are configured as apertures (e.g., slot or gap) on the cyclone sidewall 270. As exemplified in FIG. 16A, the dirt outlets 268 may have any suitable width 274. For example, in some cases the dirt outlets 268 may have a width 274 of 5 mm, 7 mm, or 10 mm. A greater width 274 may allow more dirt to exit the cyclone chamber 260.

In various embodiments, the cyclones 221 inside of the cyclone array 136 may be arranged into one or more "sets". For instance, as exemplified in FIGS. 2-27, and 32B-32D, the cyclone array 136 may comprise a first cyclone set 236 and a second cyclone set 240.

In the embodiment of FIGS. 2-16, and 32B-32D, the first cyclone set 236 corresponds to an upper cyclone row, and the second cyclone set 240 corresponds to a lower cyclone row. Alternatively, as exemplified in FIGS. 20-27, the cyclone array 136 is may be arranged generally vertically, and the first set 236 can correspond to a front column of cyclones, and the second cyclone set 240 can correspond to a rear column of cyclones (e.g., FIG. 26).

In other cases, cyclone array 136 may include more than two cyclone sets. For example, FIGS. 29-31 exemplify embodiments wherein the cyclone array 136 includes three cyclone rows 702*a*, 702*b* and 702*c*.

In the exemplified embodiments, each cyclone set 236 and 240 can include one or more cyclones 221. For instance, FIGS. 2-16 exemplify an embodiment wherein each cyclone set includes three cyclones 221. FIGS. 20-27 exemplify an embodiment wherein each cyclone set includes five cyclones 221.

The cyclone sets may be spaced apart (e.g., vertically or horizontally, as the case may be), by any desired distance. For instance, in FIG. 16A, the upper and lower cyclone rows 236, 240 are spaced apart such that the lower air inlets of the upper cyclone row are spaced from the upper air inlets of the lower cyclone row. In addition, the lower cyclone is spaced from lower wall 290 of the apparatus. Accordingly, as exemplified in FIG. 27, gaps 602 may be formed between adjacent cyclones 221 to allow for air to flow from, e.g., the front column set 236 to the rear column set 240.

Figure 26:
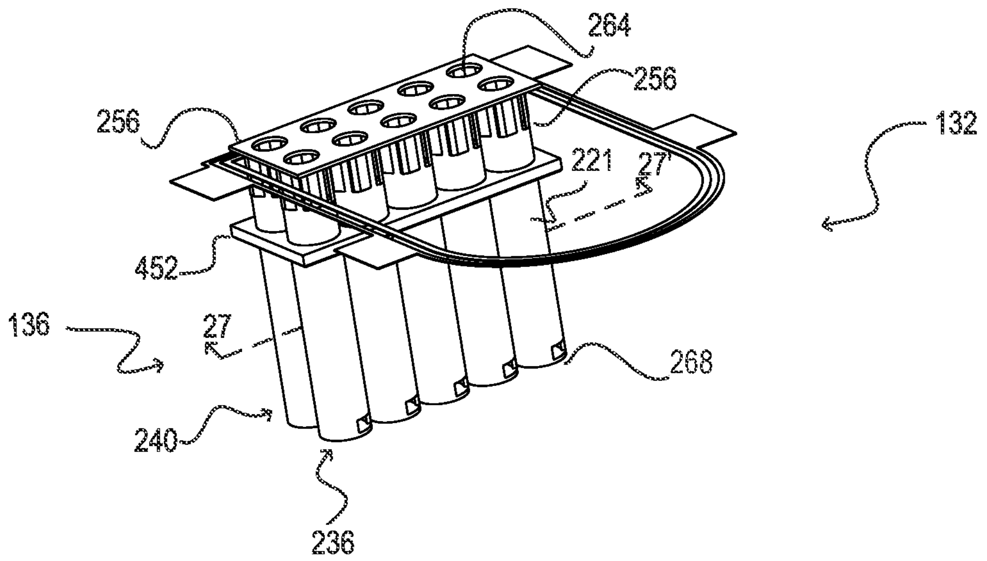
FIG. 26 is a perspective view of a cyclone array of the air treatment apparatus of FIG. 18.

As exemplified, in FIG. 26, in some cases, the cyclones 221 may be held in configuration at least by a mounting bracket 452 (see for example FIG. 26). Mounting bracket 452 may define a lower wall of a header for the cyclone inlets. Accordingly, air may travel from the momentum separator 128 through side flow channel 208 to the cyclone air inlets.

It will be understood that gaps 602 may be provided in embodiments wherein the cyclone array 136 is oriented generally horizontally with the cyclones 221 in the upper cyclone row 236 and lower cyclone row 240 positioned one on top of the other such that the upper cyclones 236 fully overly the lower cyclones 240 (e.g., the upper and lower cyclones may have the same diameter and the cyclone axes of rotation may be located in a vertical plane extending through the upper and lower cyclones). Alternatively, as exemplified in FIG. 29, gaps 602 may be provided if the cyclone array 136 is horizontally staggered (e.g., first cyclone row 236 may be positioned inwardly with respect to the lower cyclone row 240, or the first cyclone row 236 may be positioned outwardly with respect to the second cyclone row 240).

Figure 12:
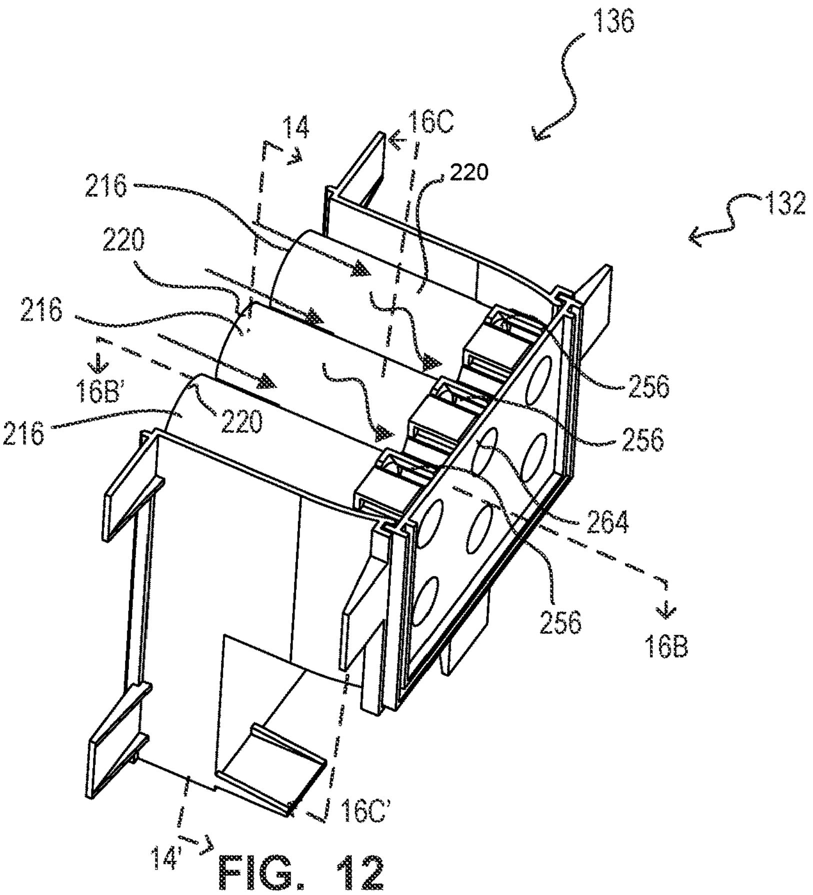
FIG. 12 is a side perspective view of a cyclone array located inside of the air treatment apparatus of FIG. 1, according to an example embodiment.
Figure 13:
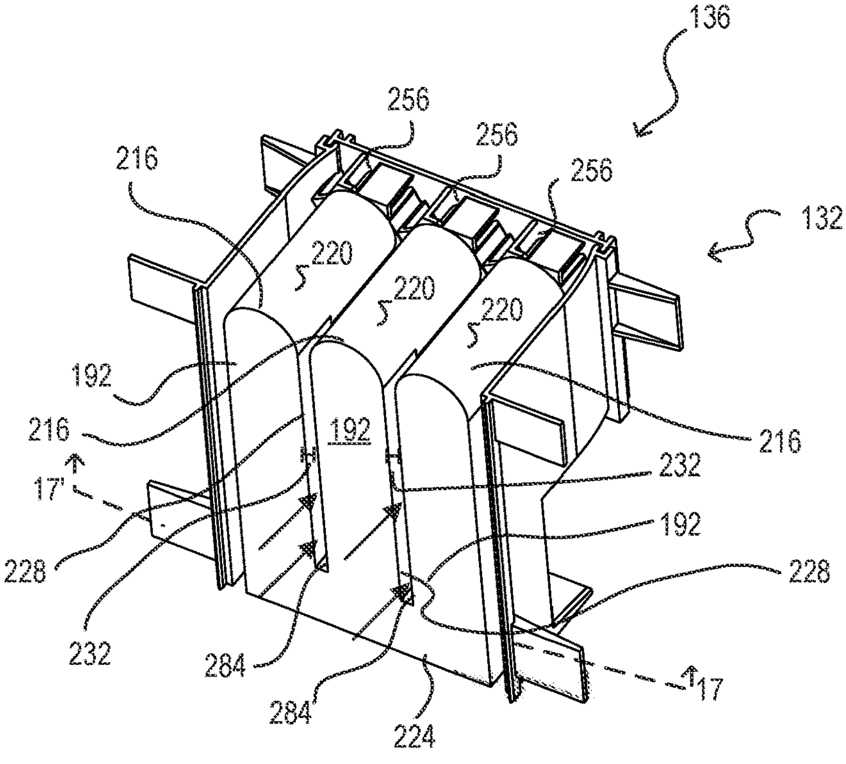
FIG. 13 is a rear perspective view of the cyclone array of FIG. 12.

In the embodiment exemplified in FIGS. 2-17 (e.g., the cyclones 221 have a generally horizontal cyclone axis configuration), the array of cyclones 136 may be provided in a single housing or, alternately, as exemplified in FIGS. 12 and 13, each column of cyclones may be provided in a discrete housing 216. As exemplified in FIGS. 12 to 13, each cyclone housing 216 includes a top 220, a bottom 224, and spaced apart lateral sides 228 that extend between the top 220 and the bottom 224.

An advantage of using discrete housings is that an airflow path may be provided between adjacent housings. As exemplified, the discrete housings 216 may be spaced apart by gaps 232 formed between opposing lateral sides 228 of each housing 216. Each gap may form part of an airflow path.

Each cyclone housing 216 may comprise one or more cyclones. In the illustrated embodiment, each cyclone housing comprises one upper cyclone 236 positioned above, and in parallel to, one lower cyclone 240.

Figure 14:
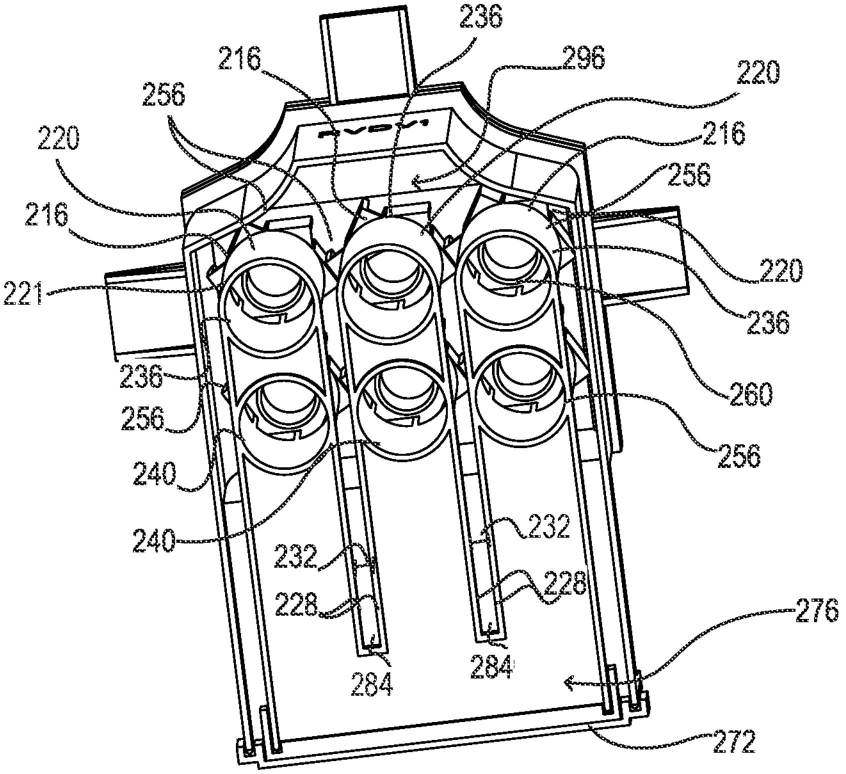
FIG. 14 is a rear perspective cross-sectional view along line 14-14' in FIG. 12 of the cyclone array of FIG. 12.
Figure 15:
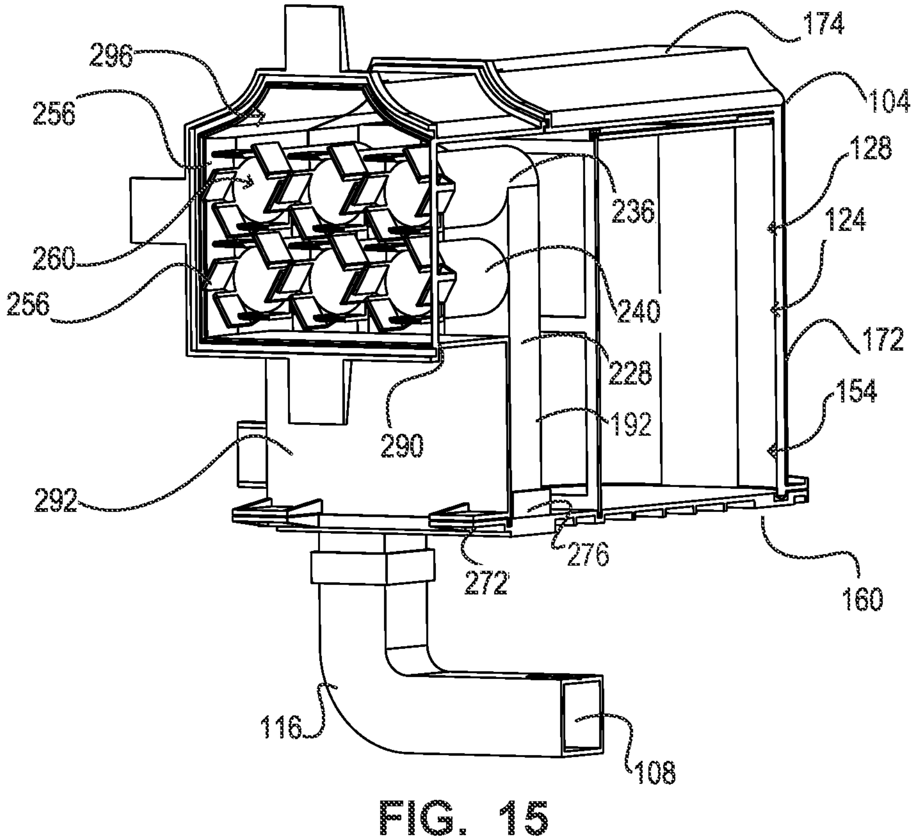
FIG. 15 is a front perspective cross-sectional view along line 15-15' in FIG. 1 of the air treatment apparatus of FIG. 1.

Air-flowing from the up flow chamber 188 and/or the side-flow chamber 208 (see FIG. 2) travels to the air inlets 256 by flowing along the exterior of the top 220 of cyclone housings 216, from the rear end of the cyclone housings 192 (which as exemplified in the end wall of up flow chamber 188) to the front end 248*a*, 248*b* of the cyclones where header 296 is located (see FIGS. 14 to 16). In addition, air flows between gaps 232 between adjacent cyclone units (i.e., when viewed from the rear, between the left lateral wall 228 of one cyclone housing 216 and the right lateral wall 228 of another cyclone housing 216). The gap 232 may have a width of 4 mm, 8 mm, or 10 mm. Gaps having a larger width may accommodate a greater (and slower) flow of air. Conversely, gaps having a narrower width may accommodate a smaller (and faster) flow of air.

In other embodiments, any other airflow path may be used to provide air to header. For example, the air may travel above the cyclone housings and/or between the cyclone housings and/or laterally beside the outer cyclone housing and/or below the cyclone housings.

It will be appreciated that, in one aspect, the cyclones may be of various configurations provided the cyclones have a dirt outlet that permits dirt to exit in a direction such that dirt exiting the dirt outlet is not impeded from collecting on a lower end of the dirt collection chamber by another cyclone in the array. Accordingly, the cyclone air inlet or outlets may be provided at various locations and the dirt outlet may also be provided at various locations. For example, the cyclones may be in a staggered configuration and/or the cyclone axis of rotation may be at an angle to the horizontal.

FIG. 16 exemplifies one embodiment of the staggered configuration. In this embodiment, the first cyclone end 248, of each of the upper cyclones 236 and lower cyclones 240 are located along a common plane. The common plane is transverse to the cyclone axis of rotation 244. Further, the axial length 280 of the upper cyclones 236 extends beyond the axial length 280 of the lower cyclones 240. Accordingly, this arrangement results in the dirt outlets 268 of the upper cyclones 236 being spaced axially rearwardly (i.e., staggered), along cyclone axis 244, from the second cyclone end 252 of the lower cyclones 240.

The dirt outlet 268 of the upper cyclones 236 may be staggered rearwardly of the second cyclone end 252, of the lower cyclone 240, by any suitable staggering distance 288. For example, the staggering distance 288 may be 4 mm, 6 mm, 8 mm, 10 mm or more. A greater staggering distance 288 can reduce the possibility that lower cyclones 240 obstructing dirt exiting the dirt outlet 268 of the upper cyclones 236. Conversely, a smaller staggering distance 288 can allow for a more compact cyclone array configuration.

Figure 29:
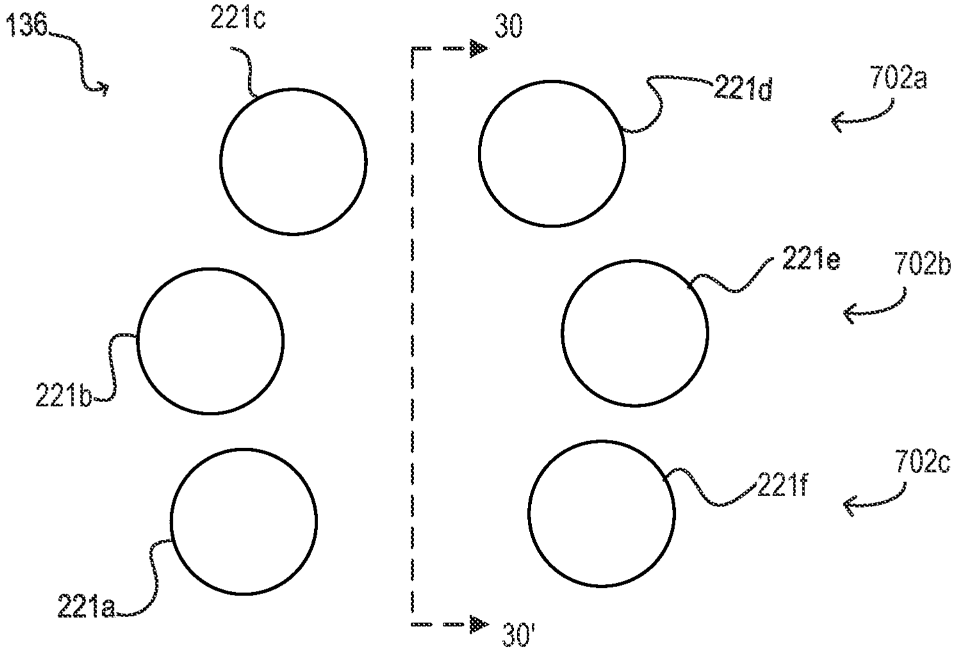
FIG. 29 is a rear vertical cross-sectional view of a cyclone array according to an alternative example embodiment.
Figure 30:
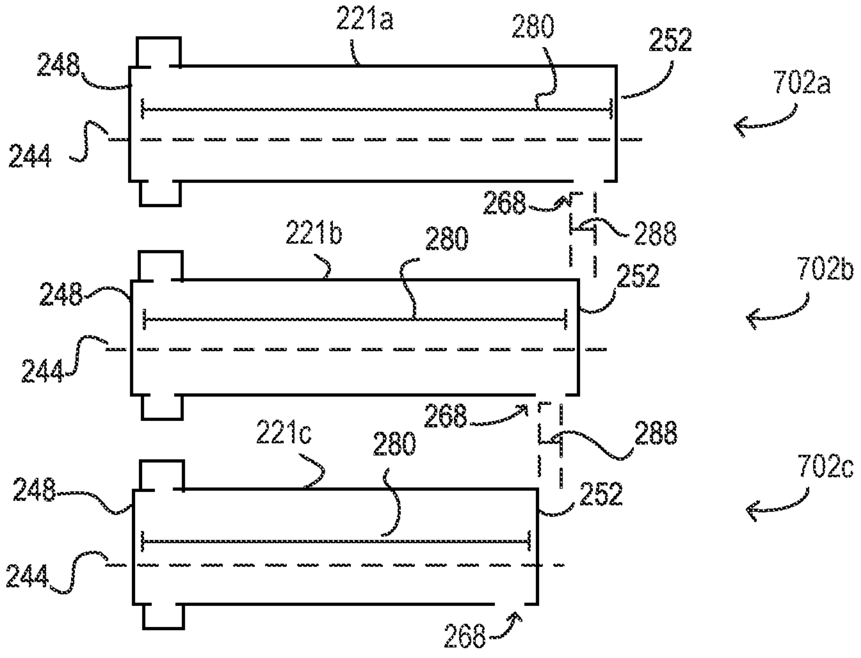
FIG. 30 is a side cross-sectional view of the cyclone array of FIG. 29 along the section line 30-30' of FIG. 29.
Figure 31:
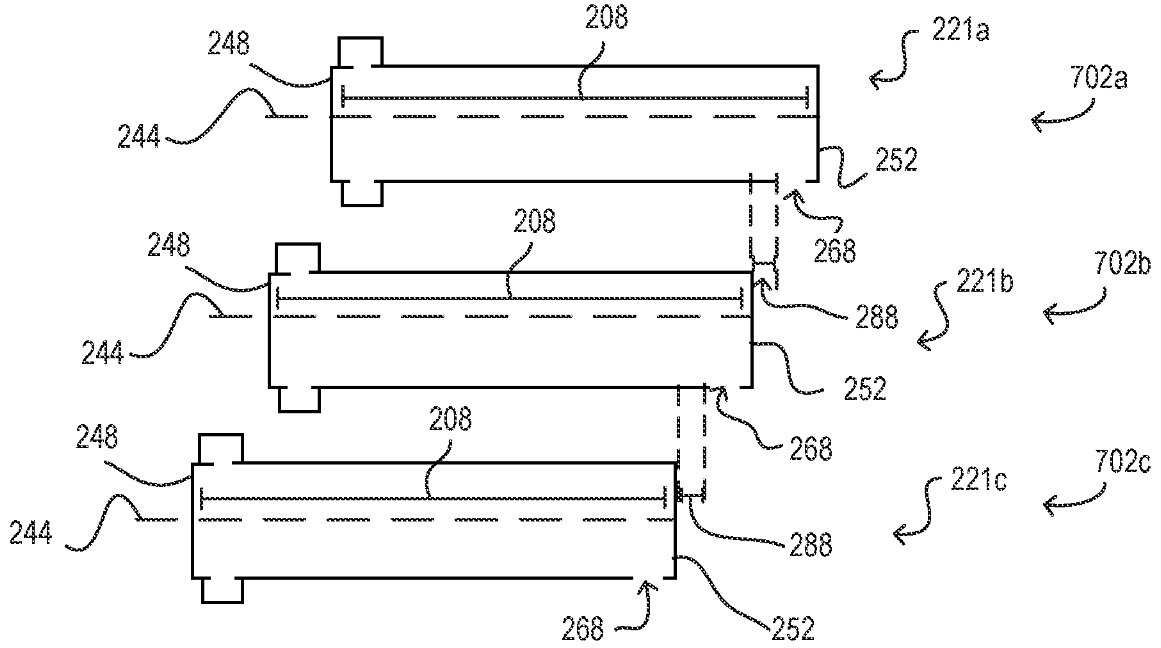
FIG. 31 is a side cross-sectional view of an alternate cyclone array of the configuration of FIG. 29.

FIGS. 29-30 exemplifies the same staggered arrangement as FIG. 16, using three cyclone rows. In the exemplary embodiment of FIG. 30, the cyclone array 136 includes six cyclones 221*a*, 221*b*, 221*c*, 221*d*, 221*e*, and 221*f* that are arranged in a generally circular geometry. The staggered configuration is achieved by the progressive shortening of the axial cyclone length 280 of cyclone units 221 in separate rows.

For example, cyclones 221*c* and 221*d* may have a length 280 of 50 mm, cyclones 221*a* and 221*f* may have a length 208 of 38 mm, and cyclones 221*b* and 221*e* may have a length 280 of 44 mm. In some cases, the cyclone units may also each have a diameter of 5 mm.

In other embodiments, a staggered configuration can be achieved using cyclones of equal length 280. For instance, as exemplified in FIG. 31, the length 280 of cyclones 221 in different row is generally equal. However, each sequentially lower row of cyclones has a first cyclone end 248 which is located forward of the first cyclone end of the cyclones of the row immediately there above. Accordingly, this generates a staggered configuration between dirt outlets 268.

FIGS. 33A-33E exemplify a further staggered configuration using cyclones 221, in different rows, of equal length. In this embodiment, the cyclone axis 240 of each cyclone row is oriented at an angle, such that the lower cyclone row does not obstruct the dirt outlet of an upper cyclone row. It will be appreciated that the cyclones may be of differing lengths.

As exemplified in FIG. 27, in embodiments wherein the cyclone array is oriented in a generally vertical direction, the cyclones may also be staggered (e.g., some cyclones may be longer than the others so that the lower ends of some cyclones are positioned lower than the lower ends of other cyclones in the array, or the cyclones may b have the same length with the lower ends of some of the cyclones positioned lower than the lower ends of other cyclones in the array). Alternately, the dirt outlets may be positioned to not directly face another cyclone.

In the embodiment exemplified in FIGS. 2-17, the dirt outlet 268 of each cyclone 221 is oriented downwardly and face a common dirt collection chamber 276, which is in communication with each of the dirt outlets 268 (see FIG. 10). The dirt outlets 268 of cyclones in the upper row 236 and the lower row 240 are arranged in a staggered configuration. The staggered configuration may be configured such that dust exiting the dirt outlet 268, of the top cyclone row 236, is not obstructed from entering the dirt collection chamber 276 by the bottom cyclone row 240. For example, the dirt outlets 268 of cyclones in the upper row 236 are rearward of the dirt outlets of the lower row 240 such that all of the dirt outlets directly face the floor of the dirt collection chamber 276. As such, dirt exiting the cyclones thought the dirt outlets 268 may collect in the dirt collection chamber 276. It will be appreciated that each cyclone set may have its own dirt collection chamber.

The dirt may travel downwardly to the floor of the dirt collection chamber 276 in a portion of the dirt collection chamber 276 that is a single contiguous space or channel, or in separate channels. As exemplified in FIG. 2 the dirt collection chamber may have a front wall 292 and a rear wall 192. Air exiting all of the cyclones travels downwardly between the front wall 292 and the rear wall 192 of the dirt collection chamber.

Alternately, as exemplified in FIGS. 16A, 16B, 16C and 17, the dirt outlets of the lower cyclones may travel to the floor of the dirt collection chamber 276 by a forward channel and the dirt outlets of the upper cyclones may travel to the floor of the dirt collection chamber 276 by a rearward channel. The forward channel may be defined by front wall 292 and intermediate wall 252 and the rearward channel may be defined by intermediate wall 252 and rear wall 192. The intermediate wall 252 may be an extension downwardly of the ear wall of the lower cyclone may continue part way or all the way to the floor 272 of the dirt collection chamber 276.

As exemplified, linking or connecting walls 284 may extend between the lower ends of adjacent lateral walls 228 to define part of a top of the dirt collection chamber. Accordingly, lateral walls 228 and rear wall 192 of cyclone housings 216 and front wall 292 may be considered to define a plurality of vertical passages that extend from the dirt outlets of the cyclones of each cyclone unit to a common volume of the dirt collection chamber 276 that is positioned below linking walls 284.

Front wall 292 may be an exterior wall of the apparatus. Alternately, a front wall 298 may be provided forward of front wall 292. As shown in FIG. 16A, front wall 292 may extend upwardly and be located between the upper and lower cyclones to isolate the dirt collection chamber from header 296.

Emptying of the Air Treatment Member

The following is a description of emptying the air treatment member that may be used by itself in any surface cleaning apparatus or in any combination or sub-combination with any other feature or features described herein.

Figure 8:
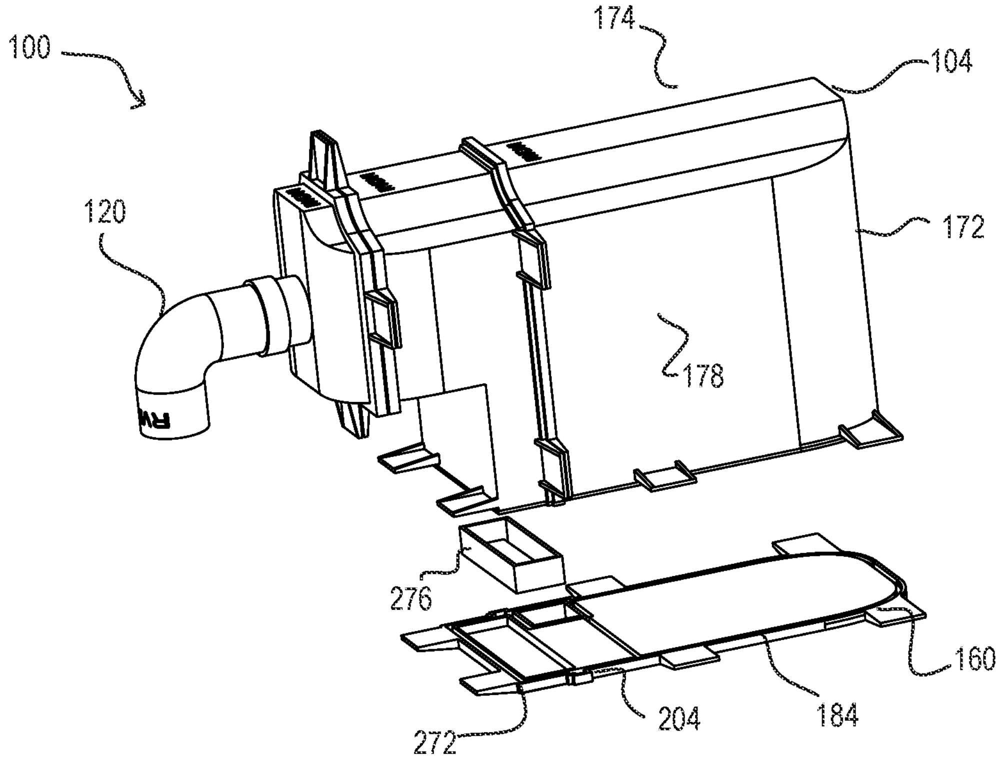
FIG. 8 is a side perspective view of the air treatment apparatus of FIG. 1, showing a lower wall of the air treatment apparatus being removed.
Figure 28:
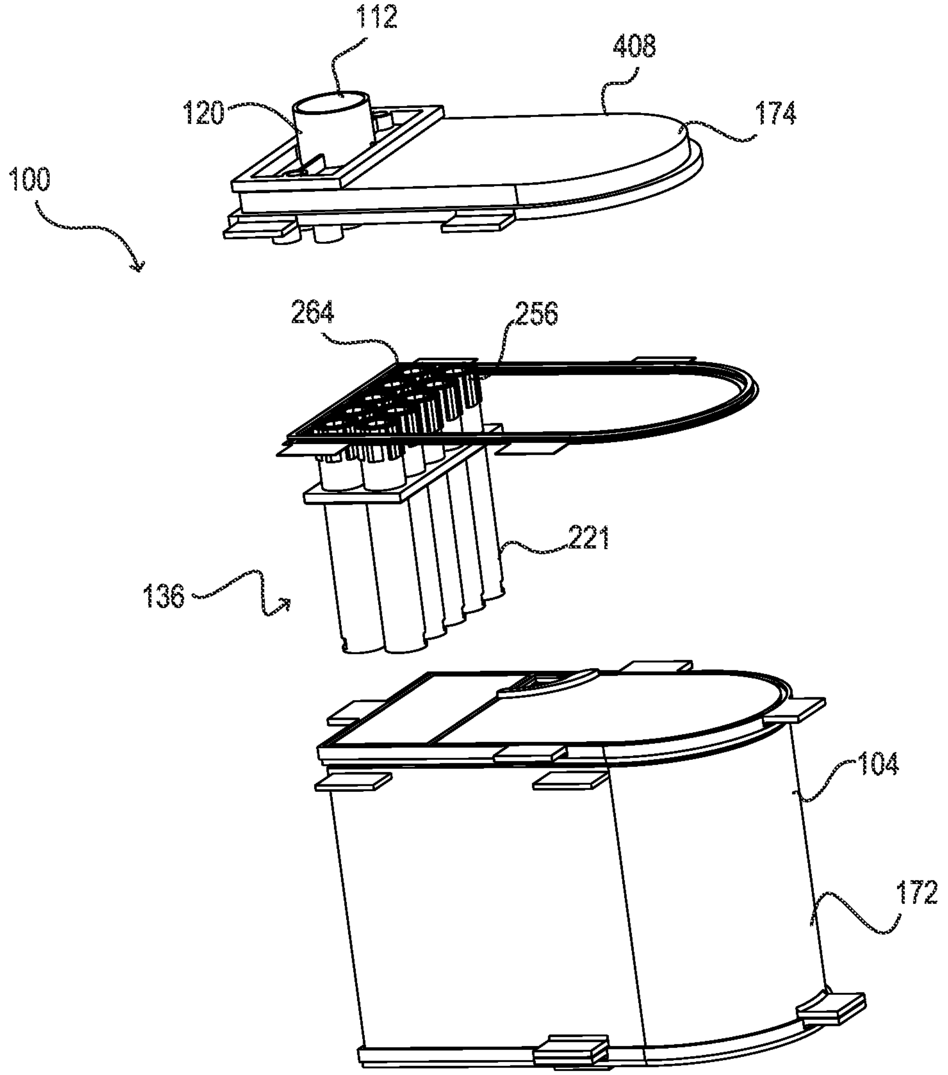
FIG. 28 is a partially exploded view of the air treatment apparatus of FIG. 18.

As exemplified in FIGS. 8, 28, and 32D, in various embodiments, the lower wall 160 of the first stage separator 124 may comprise an openable door 184. The openable door 184 facilitates emptying of the first stage separator 124 from solid debris and other containments that have accumulated therein. In embodiments wherein the first stage separator 124 comprises a momentum separator 128 (e.g., FIGS. 2-17), openable door 184 may allow emptying of dirt collected on the bottom of the separator 128. Openable door 184 also allows access to the top screen 180 and/or the side screen 176 of the momentum separator 124 (i.e., for cleaning or de-briding). Alternatively, where the first stage separator 128 comprises a cyclone unit 502 (e.g., FIG. 32D), openable door 128 facilitates cleaning of the cyclone 502 and/or the screen 522.

Optionally, as exemplified, lower wall 160 may form a common wall between the first stage separator 124 and the cyclone dirt chamber 276. Accordingly, door 184 can allow concurrent emptying of dirt that has accumulated in both the first stage separator 124 and the dirt collection chamber 276. Alternatively, or in addition, the dirt collection chamber 276 may have a separate openable door 272 from the first stage separator. In particular, this may allow for separate and independent emptying of the dirt collection chamber 276.

In the embodiment of FIGS. 2-17, openable door 184 can also allow for concurrent emptying of the up flow chamber 188. In addition, or in the alternative, the up flow chamber 188 may include a separate bottom openable door 204.

As exemplified in the embodiment of FIG. 33A, the dirt collection chamber 508 may be located below the cyclone chamber 506. In this configuration, the openable door 184 may also move plate 560 so that opening the dirt collection chamber 508 also opens the first stage dirt collection chamber 508 and optionally the second stage dirt collection chamber 276. In still other cases, each dirt chamber may have a separable open door.

The door 184 may be openable in any manner known in the art. For example, FIG. 8 exemplifies an embodiment whereby the openable door 184 is axially removably (e.g., detachable) from the housing body 104. Alternately, FIGS. 32A and 32D exemplify another embodiment wherein the openable door 184 is moveably mounted to housing body 104 between a closed position (FIG. 32B) and an open position (FIG. 32D). For instance, in the exemplified embodiment, the openable door 184 is pivotally connected to the housing body 104 by hinge 526 and moves, along an axis of rotation, between the open and closed position (FIG. 32D).

The openable door 184 can also be held in the closed position in any suitable manner. As exemplified in FIGS. 32B and 32D, the openable door 184 can be held in the closed position by a releasable latch 542.

Figure 25:
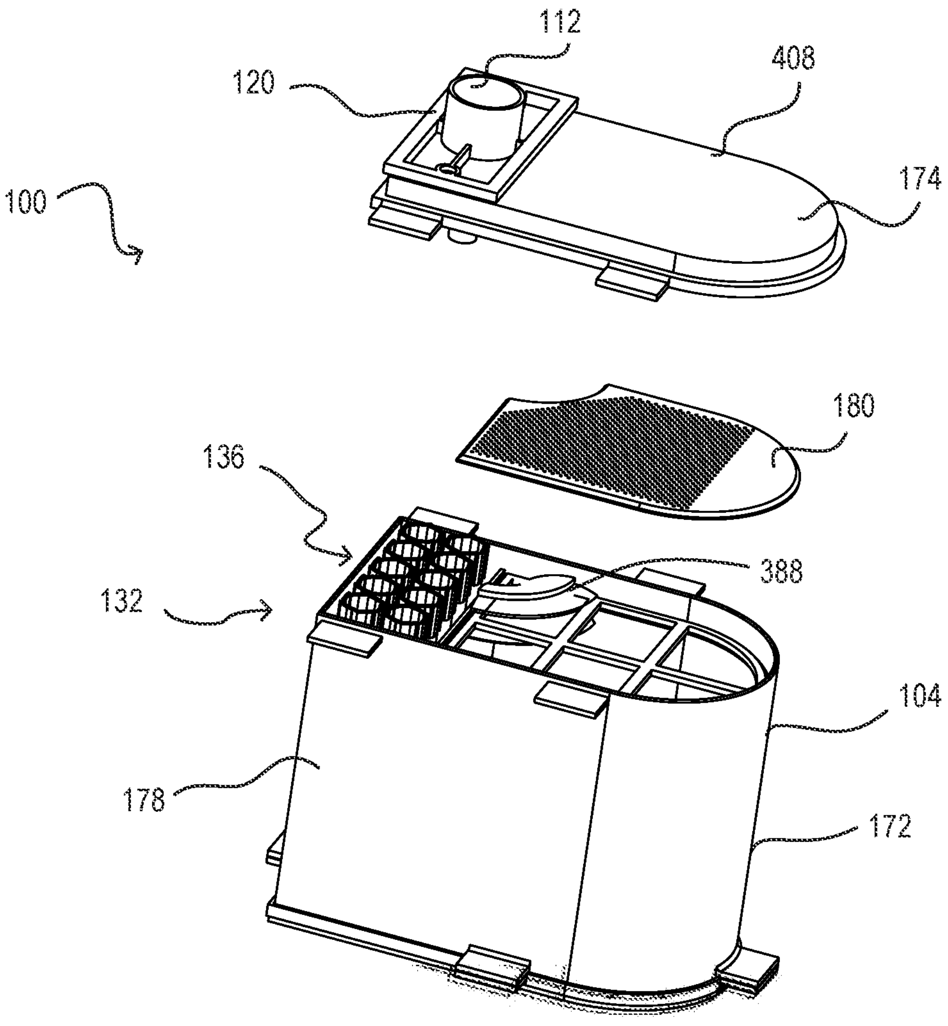
FIG. 25 is a perspective view of the air treatment apparatus of FIG. 18 showing a top lid and a top screen of the air treatment apparatus being removed.

In some embodiments, the top wall 174 of the apparatus 100 can also form a removable (or openable) top lid 408, which can be detached from the body housing 104 (e.g., FIG. 25). This configuration allows for immediate access to the top screen 180, which can be removed and independently cleaned of dust, and debris, which has accumulated thereon. As explained in further detail herein, removing the top lid 408 may also provide access to the cyclone array 136. The top lid 408 may be removably or detachably mounted to the housing body 304 in any suitable manner, or may be moveably mounted between an open and closed position to the housing 104. In at least some embodiments, each compartment of the air treatment apparatus 100 may also have a separate top lid portion.

Removable Components

Any one or more of the removable components may have any or more of the features of the first stage momentum separator, second stage momentum separator and the cyclone array discussed herein.

Alternately, or in addition, as exemplified in FIG. 8, the dirt collection chamber 276 may comprise a removable tray, which may be removed when openable door 272 is opened or removed.

In at least some embodiments, one or more components comprising the air treatment apparatus 100 may be configured for separate or joint removal from the air treatment apparatus 100 (i.e., for maintenance or cleaning). By way of non-limiting examples, the following components may be separately or jointly removed: (a) the momentum separator 128; (b) the cyclone array 136; (c) the combination of the momentum separator 128 and the cyclone array 136; (d) the combination of the momentum separator 128, the cyclone array 136, and the dust collecting chamber 276; (e) the momentum separator 128 and the dust collecting chamber 276 (without the cyclone array 136); (f) the combination of any one of (a) to (e), and one or both of the side screen 176 and the top screen 180.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A vacuum cleaner or a docking station for a vacuum cleaner comprising:

a. an air flow path extending from an air inlet of the vacuum cleaner or the docking station to an air outlet of the vacuum cleaner or the docking station;

b. a momentum separator positioned in the air flow path, the momentum separator having an air inlet and the air flow path comprises an inlet portion that extends from the air inlet of the docking station to the air inlet of the momentum separator, wherein when the vacuum cleaner or the docking station is positioned on a horizontal surface in an in use position, the momentum separator has a plurality of walls comprising an upper wall, a lower wall, a first sidewall and a second sidewall, wherein the first sidewall comprises a first side screen and wherein the second sidewall comprises a second side screen, the first and second side screens comprising an air outlet of the momentum separator;

c. a first air flow chamber positioned in the air flow path, the first air flow chamber is located between a first end wall, which is spaced from and faces the first side screen, and the first side screen; and, d. a second air flow chamber positioned in the air flow path, the second air flow chamber is located between a second end wall, which is spaced from and faces the second side screen, and the second side screen, wherein each of the first and second air flow chambers has an air outlet that is upstream of the air outlet of the vacuum cleaner or the docking station, and wherein the first air flow chamber and the second air flow chamber continue downstream to a downstream air treatment member whereby, in operation, air exits the momentum separator through the first and second side screens and travels through the first and second air flow chambers to the air outlet of the first and second air flow chambers and then the air travels to the downstream air treatment member.

2. The vacuum cleaner or docking station of claim 1 wherein the first side screen comprises a majority of the first sidewall.

3. The vacuum cleaner or docking station of claim 1 wherein the first side screen comprises a majority of the first sidewall and the second side screen comprises a majority of the second sidewall.

4. The vacuum cleaner or docking station of claim 1 wherein air exiting the air inlet of the momentum separator is directed other than towards the upper wall of the momentum separator.

5. The vacuum cleaner or docking station of claim 1 wherein the second sidewall is opposed to the first sidewall.

6. The vacuum cleaner or docking station of claim 5 wherein the first sidewall extends in a plane that is parallel to the second sidewall.

7. The vacuum cleaner or docking station of claim 1 wherein the momentum separator has a bottom openable door.

8. The vacuum cleaner or docking station of claim 1 wherein the first air flow chamber has a bottom openable first air flow chamber door.

9. The vacuum cleaner or docking station of claim 8 wherein the momentum separator has a bottom openable door and the bottom openable door and the first air flow chamber door are concurrently openable.

10. The vacuum cleaner or docking station of claim 1 wherein the first air flow chamber has a bottom openable first air flow chamber door and the second air flow chamber has a bottom openable second air flow chamber door.

11. The vacuum cleaner or docking station of claim 10 wherein the momentum separator has a bottom openable door and the bottom openable door, the first air flow chamber door and the second air flow chamber door are concurrently openable.

12. The vacuum cleaner or docking station of claim 1 wherein, when the vacuum cleaner or the docking station is positioned on a horizontal surface, the downstream air treatment member is positioned laterally beside the momentum separator and a carry handle overlies the momentum separator and the downstream air treatment member.

13. The vacuum cleaner or docking station of claim 1 further comprising a carry handle wherein, when the vacuum cleaner or the docking station is positioned on a horizontal surface, the carry handle is provided on an upper end thereof.

14. The vacuum cleaner or docking station of claim 1 wherein, when the vacuum cleaner or the docking station is positioned on a horizontal surface in an in-use position, the air outlet of the vacuum cleaner or the docking station is located below the upper wall of the momentum separator.

15. The vacuum cleaner or docking station of claim 1 wherein, when the vacuum cleaner or the docking station is positioned on a horizontal surface in an in-use position, the air outlet of the vacuum cleaner or the docking station is located below an upper wall of the first air flow chamber.

* * * * *